US008955074B2

(12) United States Patent
Barton et al.

(10) Patent No.: US 8,955,074 B2
(45) Date of Patent: *Feb. 10, 2015

(54) AUTHENTICATION METHOD OF ENUMERATED PATTERN OF FIELD POSITIONS BASED CHALLENGE AND ENUMERATED PATTERN OF FIELD POSITIONS BASED RESPONSE THROUGH INTERACTION BETWEEN TWO CREDENTIALS IN RANDOM PARTIAL DIGITIZED PATH RECOGNITION SYSTEM

(71) Applicant: Authernative, Inc., Redwood City, CA (US)

(72) Inventors: Edward M. Barton, Dublin, CA (US); Len L. Mizrah, Redwood City, CA (US)

(73) Assignee: Authernative, Inc., Redwood City, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/658,812

(22) Filed: Oct. 23, 2012

(65) Prior Publication Data

US 2014/0115679 A1    Apr. 24, 2014

(51) Int. Cl.
*G06F 15/16*    (2006.01)

(52) U.S. Cl.
USPC ................................. 726/7; 726/5; 713/182

(58) Field of Classification Search
CPC .... G09C 5/00; H04L 63/0853; H04L 9/3273; H04L 9/32
USPC .......................................... 713/182; 726/7, 5
See application file for complete search history.

(56) References Cited

U.S. PATENT DOCUMENTS

| | | |
|---|---|---|
| 5,241,599 A | 8/1993 | Bellovin et al. |
| 5,276,314 A | 1/1994 | Martino et al. |
| 5,425,102 A | 6/1995 | Moy |
| 5,440,635 A | 8/1995 | Bellovin et al. |
| 5,465,084 A | 11/1995 | Cottrell |
| 5,559,961 A | 9/1996 | Blonder |
| 6,085,320 A | 7/2000 | Kaliski |
| 6,189,098 B1 | 2/2001 | Kaliski |
| 6,209,104 B1 | 3/2001 | Jalili |
| 6,226,383 B1 | 5/2001 | Jablon |

(Continued)

OTHER PUBLICATIONS

Bolande, H.A., "Forget passwords, what about pictures?" ZDNet, Nov. 27, 2000, 2pp.

(Continued)

*Primary Examiner* — Baotran N To
(74) *Attorney, Agent, or Firm* — Haynes Beffel & Wolfeld LLP

(57) ABSTRACT

An interactive method for authentication is based on two shared secrets, both shared in the form of an ordered path on the frame of reference. An instance of the frame of reference comprises a set of characters which is arranged in a random or other irregular pattern. The first step of authentication that a user performs requires the user to remember one or all of the characters in the displayed instance of the frame of reference found in the locations in the random subset of the first ordered path by indicating characters either in these locations, or any other locations having the same characters. The second step of authentication requires that a user enter the position of the second ordered path, which only they know during an authentication session, where the challenge identifying the position of the ordered path is the single or multiple values that matches the value of the digital content of the frame of reference.

40 Claims, 14 Drawing Sheets

(56) References Cited

U.S. PATENT DOCUMENTS

| | | | |
|---|---|---|---|
| 6,332,192 | B1 | 12/2001 | Boroditsky et al. |
| 6,792,533 | B2 | 9/2004 | Jablon |
| 6,829,356 | B1 | 12/2004 | Ford |
| 6,934,860 | B1 | 8/2005 | Goldstein |
| 6,959,394 | B1 | 10/2005 | Brickell et al. |
| 7,010,692 | B2 | 3/2006 | Jablon |
| 7,073,067 | B2 | 7/2006 | Mizrah |
| 7,139,917 | B2 | 11/2006 | Jablon |
| 7,188,314 | B2 | 3/2007 | Mizrah |
| 7,359,507 | B2 | 4/2008 | Kaliski |
| 7,506,161 | B2 | 3/2009 | Mizrah |
| 7,577,987 | B2 | 8/2009 | Mizrah |
| 7,644,433 | B2 | 1/2010 | Mizrah |
| 7,681,228 | B2 | 3/2010 | Mizrah |
| 7,716,484 | B1 | 5/2010 | Kaliski, Jr. |
| 7,725,730 | B2 | 5/2010 | Juels et al. |
| 7,849,321 | B2 | 12/2010 | Mizrah |
| 8,006,300 | B2 | 8/2011 | Mizrah |
| 2004/0119746 | A1 | 6/2004 | Mizrah |
| 2004/0123160 | A1 | 6/2004 | Mizrah |
| 2004/0225899 | A1 | 11/2004 | Mizrah |
| 2008/0072045 | A1* | 3/2008 | Mizrah .................. 713/171 |
| 2012/0166791 | A1 | 6/2012 | Barton et al. |
| 2012/0166809 | A1 | 6/2012 | Barton et al. |

OTHER PUBLICATIONS

R Dhamija et al., "Deja vu: A User Study Using Images for Authentication," Proc. of the 9th USENIX Security Symp., © Aug. 2000, 15 pp.

Haubert III, W.H. "An Interactive Approach to Secure and Memorable Passwords," A Thesis in TCC 402, School of Engineering and Applied Science, Univ. of VA, Mar. 25, 2002, 26 pp.

Jermyn, I. et al., "The Design and Analysis of Graphical Passwords," Proc. 8th USENIX Security Symp., Aug. 1999, 15pp.

Lee, J., "And the Password is . . . Waterloo," New York Times, Dec. 27, 2001, 4pp.

Lemos, R., "Passwords: The weakest Link?" CNET News.com, May 22, 2002, 4pp (http://news/com.com/2009-1001-916719.html).

K.S. McCurley, "Protecting Privacy and Information Integrity of Computerized Medical Information," Sandia National Laboratories, Mar. 11, 1996, 27 pp. (http://www.swcp.com/mccurley/cs.sandia.gov/health/health.html).

A. Perrig et al., "Hash Visualization: a New Technique to improve Real-world Security," Computer Science Dept., Carnegie Mellon Univ., 8 pp. (http://paris.cs.berkeley.edu%7Eperrig/projects/validation/validatio-n/pdf).

Reynolds, M. "Microsoft TechFest Signposts Software Futures," Gartner Dataquest Perspective, Gartner, Inc., 2002, 8 pp.

Perrig A., et al., "Deja vu: Using Images for User Authentication," Oct. 2000, 2 pp. (http://www.sims.berkeley.edu/dejavu).

"The Science Behind Passfaces," © Real User Corporation, Jun. 2004, 5 pp. (http://www.realusercom/published/ScienceBehindPassfaces.pdf).

Extended European Search Report Mailed May 26, 2010 in Application No. 07114710.2, 7 pp.

Wikipedia, "Hardware security module," Oct. 2012, 4 pp. (http://en.wikipedia.org/wiki/Hardware_security_module).

* cited by examiner

| 10 | 5 | 3 | 6 | 1 | 5 | 10 | 6 | 9 | 6 |
| --- | --- | --- | --- | --- | --- | --- | --- | --- | --- |
| 2 | 1 | 10 | 8 | 5 | 7 | 4 | 7 | 1 | 10 |
| 5 | 3 | 5 | 4 | 1 | 9 | 3 | 2 | 4 | 3 |
| 7 | 10 | 7 | 10 | 6 | 7 | 4 | 6 | 5 | 6 |
| 2 | 4 | 1 | 9 | 4 | 10 | 8 | 9 | 4 | 7 |
| 8 | 7 | 3 | 7 | 8 | 2 | 5 | 2 | 6 | 3 |
| 5 | 6 | 10 | 2 | 10 | 3 | 1 | 7 | 9 | 1 |
| 10 | 3 | 9 | 8 | 4 | 6 | 9 | 2 | 8 | 3 |
| 8 | 7 | 1 | 6 | 9 | 8 | 5 | 1 | 5 | 9 |
| 4 | 9 | 2 | 8 | 1 | 2 | 3 | 8 | 4 | 2 |

Fig. 3

| 10 | 5 | 3 | 6 | 1 | 5 | 10 | 6 | 9 | 6 |
|----|---|---|---|---|---|----|---|---|---|
| 2 | 1 | 10 | 8 | 5 | 7 | 4 | 7 | 1 | 10 |
| 5 | 3 | 5 | 4 | 1 | 9 | 3 | 2 | 4 | 3 |
| 7 | 10 | 7 | 10 | 6 | 7 | 4 | 6 | 5 | 6 |
| 2 | 4 | 1 | 9 | 4 | 10 | 8 | 9 | 4 | 7 |
| 8 | 7 | 3 | 7 | 8 | 2 | 5 | 2 | 6 | 3 |
| 5 | 6 | 10 | 2 | 10 | 3 | 1 | 7 | 9 | 1 |
| 10 | 3 | 9 | 8 | 4 | 6 | 9 | 2 | 8 | 3 |
| 8 | 7 | 1 | 6 | 9 | 8 | 5 | 1 | 5 | 9 |
| 4 | 9 | 2 | 8 | 1 | 2 | 3 | 8 | 4 | 2 |

| 1 | 9 | 5 | 8 | 7 | 8 | 4 | 7 | 3 | 10 |
|---|---|---|---|---|---|---|---|---|---|
| 3 | 7 | 4 | 3 | 6 | 10 | 5 | 9 | 1 | 8 |
| 6 | 5 | 6 | 2 | 9 | 4 | 7 | 8 | 6 | 4 |
| 7 | 9 | 8 | 10 | 7 | 1 | 2 | 4 | 2 | 5 |
| 2 | 4 | 7 | 5 | 9 | 5 | 3 | 10 | 1 | 10 |
| 3 | 8 | 1 | 6 | 10 | 1 | 6 | 8 | 3 | 5 |
| 4 | 2 | 9 | 2 | 8 | 5 | 10 | 4 | 10 | 2 |
| 7 | 5 | 1 | 4 | 6 | 9 | 6 | 1 | 9 | 4 |
| 3 | 3 | 10 | 5 | 2 | 6 | 8 | 3 | 7 | 2 |
| 8 | 2 | 9 | 7 | 3 | 1 | 9 | 1 | 10 | 6 |

In-band grid

Enumerated Pattern 1 hatched for easy reference

Fig. 8A

| 10 | 5 | 3 | 6 | 1 | 5 | 10 | 6 | 9 | 6 |
|---|---|---|---|---|---|---|---|---|---|
| 2 | 1 | 10 | 8 | 5 | 7 | 4 | 7 | 1 | 10 |
| 5 | 3 | 5 | 4 | 1 | 9 | 3 | 2 | 4 | 3 |
| 7 | 10 | 7 | 10 | 6 | 7 | 4 | 6 | 5 | 6 |
| 2 | 4 | 1 | 9 | 4 | 10 | 8 | 9 | 4 | 7 |
| 8 | 7 | 3 | 7 | 8 | 2 | 5 | 2 | 6 | 3 |
| 5 | 6 | 10 | 2 | 10 | 3 | 1 | 7 | 9 | 1 |
| 10 | 3 | 9 | 8 | 4 | 6 | 9 | 2 | 8 | 3 |
| 8 | 7 | 1 | 6 | 9 | 8 | 5 | 1 | 5 | 9 |
| 4 | 9 | 2 | 8 | 1 | 2 | 3 | 8 | 4 | 2 |

Out-of-band grid

Enumerated Pattern 2 hatched for easy reference

Fig. 8B

AUTHENTICATION METHOD OF ENUMERATED PATTERN OF FIELD POSITIONS BASED CHALLENGE AND ENUMERATED PATTERN OF FIELD POSITIONS BASED RESPONSE THROUGH INTERACTION BETWEEN TWO CREDENTIALS IN RANDOM PARTIAL DIGITIZED PATH RECOGNITION SYSTEM

RELATED APPLICATIONS

The present application is related to co-pending U.S. patent application Ser. No. 13/658,800, filed on 23 Oct. 2012, now U.S. Pat. No. 8,868,919, entitled AUTHENTICATION METHOD OF FIELD CONTENTS BASED CHALLENGE AND ENUMERATED PATTERN OF FIELD POSITIONS BASED RESPONSE IN RANDOM PARTIAL DIGITIZED PATH RECOGNITION SYSTEM, and co-pending U.S. patent application Ser. No. 13/658,815, filed on 23 Oct. 2012, entitled BACK-END MATCHING METHOD SUPPORTING FRONT-END KNOWLEDGE-BASED PROBABILISTIC AUTHENTICATION SYSTEMS FOR ENHANCED CREDENTIAL SECURITY, both of which have the same inventors, and both of which are incorporated by reference as if fully set forth herein.

FIELD OF THE INVENTION

The invention relates generally to computer security, and systems that store and authenticate user based credentials. In particular, the invention relates to improving the front end security of in- and out-of-band authentication algorithms utilizing client/server shared secret enumerated fields of pattern based credentials on a grid of fields, each session randomized redundant content on the grid, and interactive authentication method based on Random Partial Digitized Path Recognition (RPDPR) protocol.

DESCRIPTION OF RELATED ART

The problem with passwords: passwords are static user credentials. This is a fundamental weakness in the secret. Even if a strong password is chosen by a user, it's long with alpha-numeric and special characters, it can still be stolen by an attacker by many different means including sniffing, key logging, phishing, shoulder surfing, man-in-the-middle, and many different types of malware. An additional consideration with passwords is that if network vulnerability was discovered, than all the passwords that flowed through the network during the window of exposure would have to be considered compromised.

Increasing password length and complexity (upper/lower size letters, adding alphanumeric characters and special marks, and alike) are well beyond users' comfort level to memorize such credential, which is leading to the increased cost of frequent credential reset requests. Hence, the problems with passwords cannot be solved by improving upon the password, a paradigm shift is required. The Random Partial Digitized Path Recognition (RPDPR) and the Random Partial Pattern Recognition (RPPR) algorithms—invented by Mizrah in U.S. Pat. Nos. 7,188,314 and 7,073,067 respectively—describe just such a paradigm shift. These algorithms were created to solve some of the many deficiencies of static passwords including: memorization difficulties, low security, and a number of front end attack vectors like phishing, man-in-the-browser, malware, and Trojans. To reduce memorization pressure, significantly improve ease of use, and solve many front end security flaws with static credentials like password, the RPDPR and RPPR technologies utilize dynamic grids of fields, and a graphical pattern of fields that is the shared secret.

The RPDPR and RPPR technologies are very flexible. And while the embodiments in the arts describe a position based response on a static grid, it does not have to be. The grids can be larger or smaller. They can have redundant digital content in the grid. The digital content can be random or static. The response can either be based on the correct position of the pattern, or it can be the digital content that is in the field. In fact, these algorithms can have a grid with redundant random digital content in the fields that is different per session and the authentication response is content based. This combination gives the best front end and on the wire security.

To define a couple of terms to be used in this specification.

Enumerated pattern is an authentication factor term—and it is a graphical credential based on enumerated pattern of fields on a grid of fields. The enumerated pattern term can also be used to describe any number of authentication algorithms that can be applied to the graphical credential based on an enumerated pattern of fields on a grid of fields. The enumerated pattern includes an ordered, or otherwise enumerated, list of credential elements, where each element has a credential value, and where the ordered list in combination can be characterized as a pattern on the grid.

A grid is a frame of reference. Other types of frames of reference can be utilized as well. An instance of a frame of reference includes fields that have locations on the frame of reference. A data set identifying an enumerated pattern of fields on a frame of reference can include data fields identifying locations on the frame of reference and numbered positions in the enumerated pattern. Such a data set can for example include an array of data entries having addresses (byte or word boundary addresses for example) by which the numbered positions are identifiable, where the entries in the array store coordinates of the locations of the fields on the frame of reference in the enumerated pattern. In another alternative, rather than using addresses to identify numbered positions in the enumerated pattern, the entries in the array can directly store the numbers of the corresponding enumerated positions. Of course other organizations and structures for the data set can be used.

An example of an enumerated pattern based authentication credential can be understood as follows. An enumerated pattern is based on a visual pattern and visual pattern recognition. This type of credential is easier to remember than strong traditional passwords while still being very secure. Since enumerated pattern is a visual pattern, it is best introduced with a picture (See FIG. 1). The credential is an enumerated pattern. In this example, it is in the shape of an 'L' that starts at the top and goes down and then right. A grid with empty fields, like the one in FIG. 1, would be used for the credential setup. The login grid would contain redundant random digital content. This can be anything from letters to numbers to symbols. See FIG. 2 for an example of using numbers as the digital content.

Further using FIG. 2 as the basis of an example that is merely one way to implement the login operation for enumerated pattern authentication:

To authenticate a user who has already submitted their digital identifier to the server (a fictitious user name), the server sends back to the user a 10×10 grid of fields filled with random content, which is different every session. In addition, the user is challenged with certain field positions along the pattern—say, the $2^{nd}$, $4^{th}$, $5^{th}$, and $9^{th}$ positions. These positions could simply be called the challenge(s).

Since the response includes the digital content in the enumerated pattern challenge positions, the user could enter the response by typing them, clicking on the appropriate field, or even clicking on a totally different field that has the same digit in it. Referencing FIG. 2 where the enumerated pattern is highlighted for easy reference (FIG. 1 has the explicitly enumerated pattern field positions):

The digital content in enumerated pattern field position 2 is 7.

The digital content in enumerated pattern field position 4 is 3.

The digital content in enumerated pattern field position 5 is 10.

The digital content in enumerated pattern field position 9 is 9.

Since the digital content in the grid is different every session, the authentication response code would be different even if the next challenge was 2, 4, 5, and 9 again. However, note that the challenge in is also randomized, can be any number of positions, and does not have to be in ascending or descending order.

For example, the next authentication challenge could be 10, 2, 3, 8, and 5. This allows for different levels of security, randomness, and usability that can easily be changed to suit the needs of a particular user base. The digital content, in this case 7, 3, 10, and 9 is sent to the server and checked.

This example illustrates the following separate parts: the user credential, the grid, the challenge, and the response.

The base enumerated pattern authentication algorithm can also be used with in- and out of-band techniques as described in Mizrah's U.S. Pat. No. 7,849,321 (a hidden, in-band secret challenge) and U.S. Pat. No. 8,006,300 (an out-of-band challenge). There are multiple ways to do this. For example, the random challenge could be send out of band. The grid with randomized digital content could be sent out of band. Both of them could be sent out of band to the same, or different, devices. This solves one of the biggest problems with hard- and soft-what-you-have tokens in that if they are stolen and then the factor is compromised.

Even if the hard- or soft-token is password or pin protected, this is, at best, a minor protection since the problems with passwords/pins are well known and fairly easy to circumvent. This means that traditional out-of-band factors really are what-user-has factors of authentication, which, by definition, are compromised if the user no longer has the token. An example of a simple way that the challenge and the response use a what-you-have authentication factor is to send the authentication challenge out-of-band via SMS/MMS to a mobile device. This means that even if the device is stolen (or the SMS/MMS channel is pre-empted), the malicious attacker merely has access to the challenge and the grid with the session specific random content. This is not enough to authenticate since the credential is still unknown to the attacker.

A related application filed on the same day, and by the same inventors as of the current application, and entitled "AUTHENTICATION METHOD OF FIELD CONTENTS BASED CHALLENGE AND ENUMERATED PATTERN OF FIELD POSITIONS BASED RESPONSE IN RANDOM PARTIAL DIGITIZED PATH RECOGNITION SYSTEM" U.S. patent application Ser. No. 13/658,800 (now U.S. Pat. No. 8,868,919), which is incorporated by reference as if fully set forth herein, shows that there is a significant, and highly beneficial, advantage to use the enumerated position as the response. When the content is used as a response, an attacker can record the grid and response and begin to build a statistical map where, with many gathered sessions worth of data, they can uncover the enumerated pattern credential. There are many industry standard methods to make the recording of data more difficult on the wire, like TLS encryption, and they would certainly help. However, the easiest place to attack any authentication system with the intent of collecting data is to just get it from the front end client machine where the data must be in the clear. Some of the most prevalent and cheapest forms of attacks like key logging, malware, Trojans, screen scraping, and man in the browser, session video recording, and shoulder surfing all can easily gather the data needed to break the credential, once they are present on the client machine. This can somewhat be mitigated in an enterprise by network security and managed client machines with mandatory antivirus software, but the problem cannot be solved in any type of consumer environment where the authentication systems must accept connections from many clients that they have no way of knowing if they are being recorded or not, infected or not. Furthermore, this data can be collected even if the challenge is hidden (say, for example, it is sent out of band). However, given enough sessions, the enumerated pattern credential can be broken just with the grid data and the corresponding responses.

Looking at the difference between the previous example of a position based challenge and content based response and the current example of content based challenge and position based response, FIGS. 1 and 2 will be revisited with an illustrative example of an embodiment using the content based challenge and position based response. Given the same enumerated pattern credential in FIG. 1 and using FIG. 2 for the login operation, the challenge to the user would now be a number that is digital content in a field. The user would traverse the enumerated pattern credential and look for the field that has the same digital content. The response would be the position in the enumerated pattern where that digital content is found. So if, for example, given that the challenge is 6, the response would be 8 (the user would 'look' along the enumerated pattern credential until they found a field with a 6 in it), that, in this case, is position 8 of the enumerated pattern.

So if a given session specific challenge was: 1, 5, 8, 10 then the responses would be:

The position of the enumerated pattern that has digital content of 1 in it is 3

The position of the enumerated pattern that has digital content of 5 in it is 1

The position of the enumerated pattern that has digital content of 10 in it is 5

The position of the enumerated pattern that has digital content of 8 in it is 10

The current invention takes the concepts of the two different types authentication based on a credential of enumerated fields on a grid of fields and combines them in a non-obvious way to create an algorithm that achieves results that are non-trivial and much more secure than using them separately or layered.

The prior art references are listed below:

REFERENCES

| | | |
|---|---|---|
| 5,276,314 | Martino et al. | January 1994 |
| 5,425,102 | Moy | June 1995 |
| 5,465,084 | Cottrell | November 1995 |
| 5,559,961 | Blonder | September 1996 |
| 6,085,320 | Kaliski, Jr. | July 2000 |
| 6,189,098 | Kaliski, Jr. | February 2001 |
| 6,209,104 | Jalili | March 2001 |

-continued

| | | |
|---|---|---|
| 6,332,192 | Boroditsky et al. | December 2001 |
| 6,934,860 | Goldstein | August 2005 |
| 7,073,067 | Mizrah | Jul. 4, 2006 |
| 7,188,314 | Mizrah | Mar. 6, 2007 |
| 7,506,161 | Mizrah | Mar. 17, 2009 |
| 7,577,987 | Mizrah | Aug. 18, 2009 |
| 7,644,433 | Mizrah | Jan. 5, 2010 |
| 7,681,228 | Mizrah | Mar. 16, 2010 |
| 7,849,321 | Mizrah | Dec. 7, 2010 |
| 8,006,300 | Mizrah | Aug. 23, 2011 |
| 20040119746 | Mizrah | Jun. 24, 2004 |
| 20040225899 | Mizrah | Nov. 11, 2004 |
| 20040123160 | Mizrah | Jun. 24, 2004 |

"Pass-Go, a New Graphical Password Scheme" by Hai Tao; Thesis submitted to the Faculty of Graduate and Postdoctoral Studies for the Master of Applied Science degree in Electrical and Computer Engineering .COPYRGT. Hai Tao, Ottawa, Canada, June 2006 110 pages University of Ottawa.

H. A. Bolande, "Forget passwords, what about pictures?" WSJ Interactive Edition, Nov. 27, 2000.

R Dhamija et al., "Deja vu: A User Study Using Images for Authentication," SIMS/CS, Univ. CA Berkeley, http://paris.cs.berkeley.edu/%7Eperrig/projects/usenix2000/usenix.pdf.

W. H. Haubert III, "An Interactive Approach to Secure and Memorable Passwords," A Thesis in TCC 402 presented to the Faculty of School of Engineering and applied Science, Univ. of VA, Mar. 25, 2002, pp. 1-22.

I. Jermyn et al., "The Design and Analysis of Graphical Passwords," Proceedings of the 8th USENIX Security symposium, Washington, D.C. Aug. 23-26, 1999, 15 pp.

J. Lee, "And the Password is . . . Waterloo," New York Times, Dec. 27, 2001, 6 pp.

R. Lemos, "Passwords: The weakest Link?" CNET News.com, May 22, 2002, http://news/com.com/2009-1001-916719.html.

K. S. McCurley, "Protecting Privacy and Information Integrity of Computerized Medical Information," Sandia National Laboratories, Mar. 11, 1996, http://www.swcp.com/lmccurley/cs.sandia.gov/health/health.html.

A. Perrig et al., "Hash Visualization: a New Technique to improve Real-world Security," Computer Science Dept., Carnegie Mellon Univ., pp. 1-8, http://paris.cs.berkeley.edu/%7Eperrig/projects/validation/validatio-n/pdf.

M. Reynolds, "Microsoft TechFest Signposts Software Futures," Gartner Dataquest Perspective, Gartner, Inc., 2002.

"Deja vu: Using Images for User Authentication," Nov. 12, 2002, http://www.realuser.com/published/ScienceBehindPassfaces.pdf.

"The Science Behind Passfaces," September 2001, Real User Corporation, http://www.realuser.com/published/ScienceBehindPassfaces.pdf.

European Search Report Mailed May 26, 2010 in Application No. 07114710.2, 8 pages.

SUMMARY OF THE INVENTION

The present invention takes the two types of authentication concepts based on a enumerated credential of fields on a grid of fields—the first one using an enumerated position based challenge and a digital content based response and the second using a digital content based challenge and a enumerated position based response—and combines them in a novel and non-obvious way such that the result is much more secure than using the two separately or layered; in short, a prime example of 'the sum is greater than the part'. In these two authentication concepts, there were ways to break the credential, when the authentication was all done in-band (for example, in a browser) and a certain critical mass of sessions was accrued and analyzed. In fact, many publications and conventional wisdom suggests that this will always be true: that an all in-band solution will have a flaw that can be exploited by malicious attackers on the front end where the credentials are entered and the said credentials would be leaked/broken/stolen. One of the biggest consequences to this invention is that it results in an algorithm that is believed impossible to break on the front end by typical front end attack vectors.

BRIEF DESCRIPTION OF THE DRAWINGS

FIG. 3 is an example of a credential creation grid with two separate specified enumerated pattern based credentials.

FIG. 8A and FIG. 8B are an example of a login operation grid both in- (FIG. 8A) and out-of-band (FIG. 8B) grids with the credentials from FIG. 3.

DETAILED DESCRIPTION OF THE INVENTION

Figure 1:
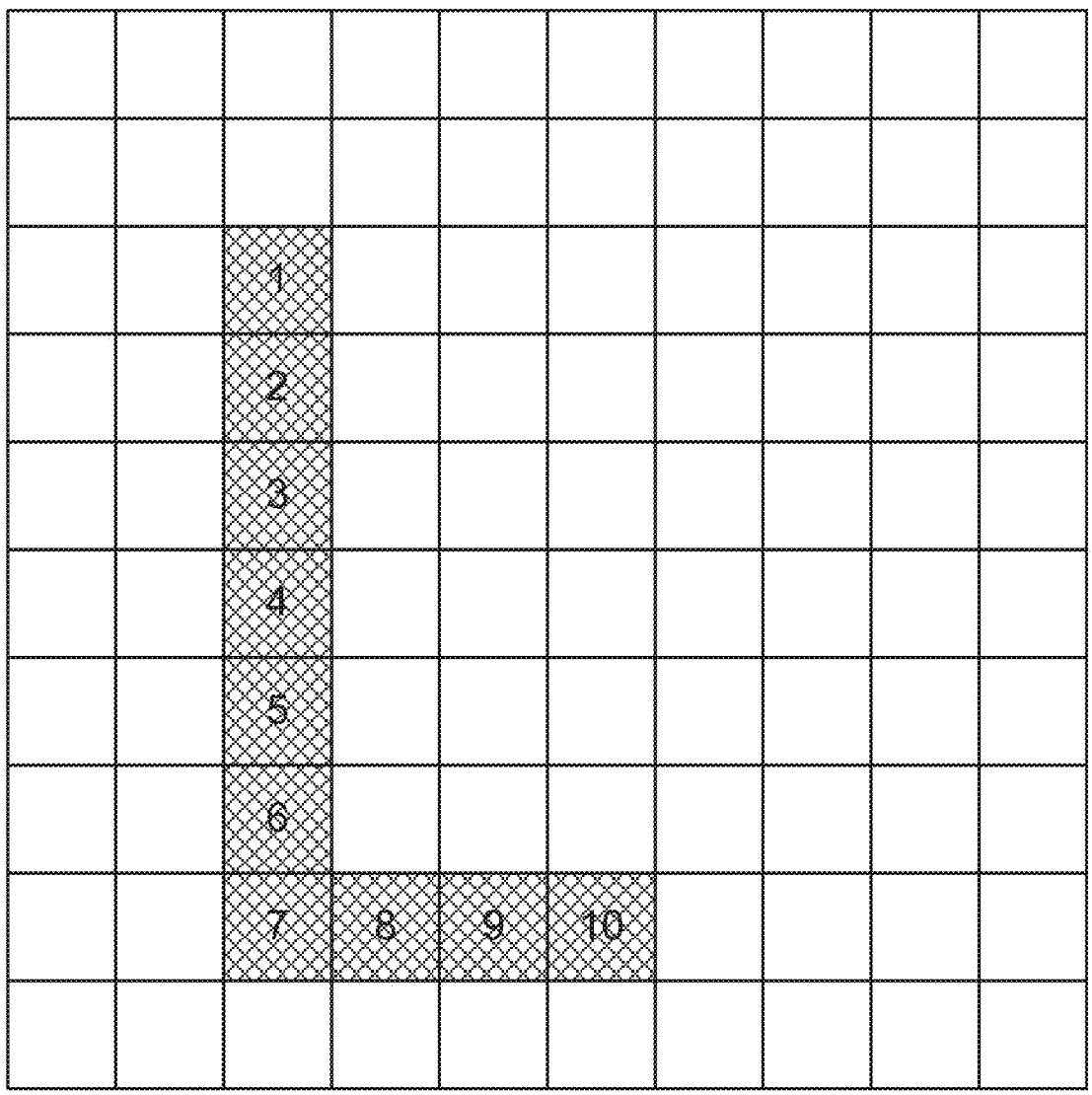
FIG. 1 is an example of a credential creation grid with a specified enumerated pattern based credential.

The present invention is a modification of, and improvement on, the enumerated pattern authentication front end. The new method and system is similar in many ways. The grid with the random digital content is the same. The enumerated pattern credential, the enumerated pattern of fields in a grid of fields, is also the same. As such the invention presented herein has no changes to the way the credential creation operation would work, besides the fact that two must be created. To use an embodiment as an example, in both cases (prior arts and this invention) there is a grid of fields with no digital content. The credential is still an enumerated pattern of fields on the grid (see FIG. 1). The credential creation operation, for any one credential, is the same. However, since two credentials are needed for this invention the user must set up two credentials. This can be done in many different ways that would be familiar to someone skilled in the art. For example, it could be done on serially on two separate grids by creating one credential and then creating the second credential. So one credential could be created and sent to the server (like FIG. 1) and then the next credential could be created and sent to the server. As another example, both credentials could be created at the same time on the same credential setup grid (See FIG. 3).

The difference is with the login operation and the interaction between the two credentials. The prior art uses both a position based challenge and content based response as well as a content based challenge and position based response. This invention uses the interaction between two credentials to create an enumerated position based challenge and an enumerated position based response. The removal of the digital content in the clear—in one case as the response and in the second case as the challenge—creates a major and highly significant security enhancement in the in-band case as well as some minor improvements in the out-of-band case.

There are two embodiments for the login operation for this invention—an in-band and an out-of-band example—that will be looked at in detail. These are not the only embodiments that can be used for the algorithm and are merely used as illustrative examples. The common details that both examples share are typical of client-server architecture: the client is a browser, a server, a communication medium that connects the client and server, a user store connected in some manner to the server, a user with their enumerated credentials that are saved in the user store. Additionally, the login operation will be a 10×10 grid of fields that contain random per-session digital content. The digital content is redundant and ten each of the numbers 1 to 10. So ten 1's, ten 2's, ten 3's, etc scattered randomly throughout the grid of fields.

Figure 4:
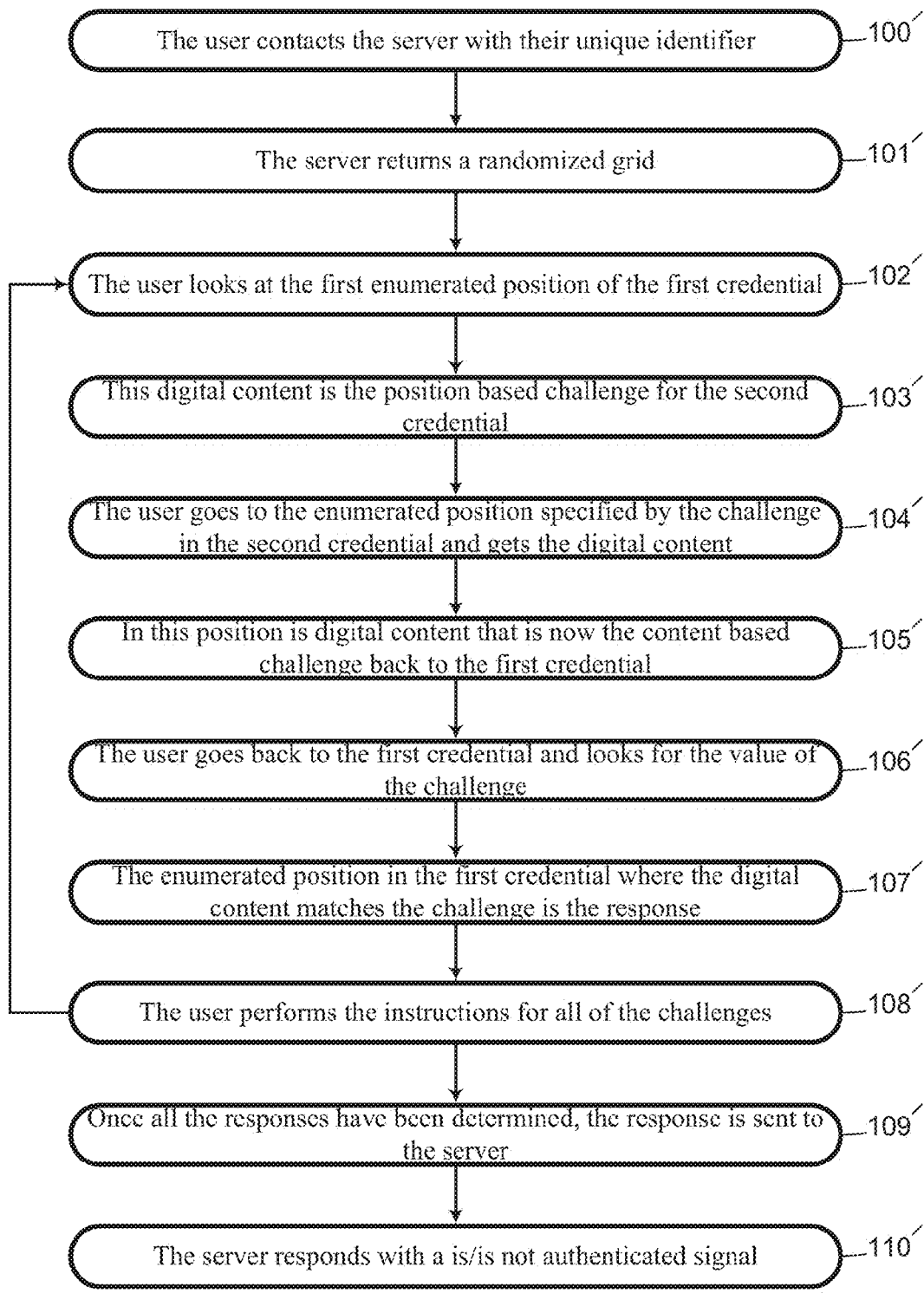
FIG. 4 is a flowchart of an embodiment of the in-band login operation.

In-Band Authentication Method of Enumerated Position-Based Challenge and Enumerated Position-Based Response The algorithmic steps for the login operation of an in-band embodiment of this invention are as follows and are also shown in FIG. 4:

In step 100 the user contacts the server with their unique identifier

In step 101 the server returns a randomized grid

Figure 3:
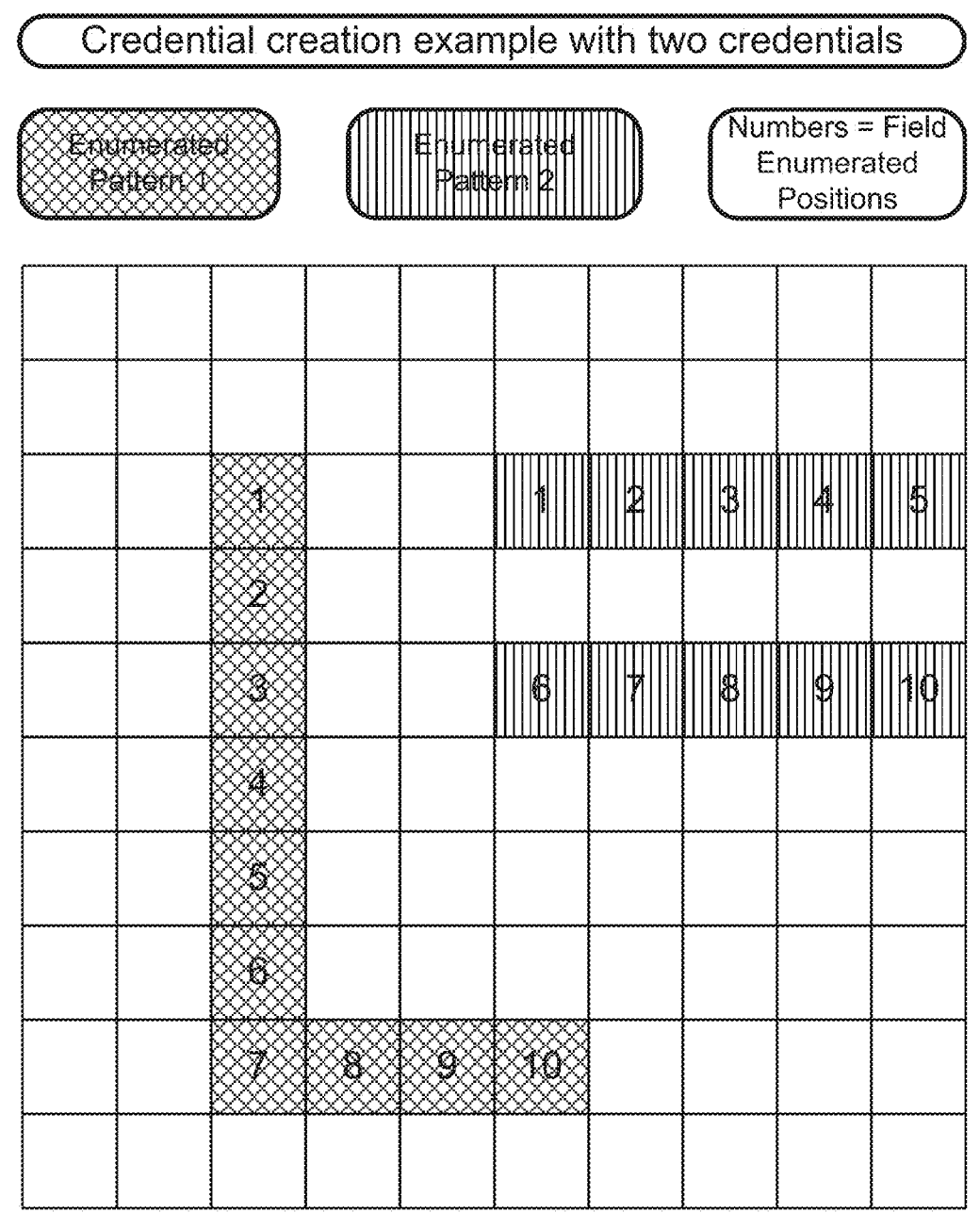
Figure 5:
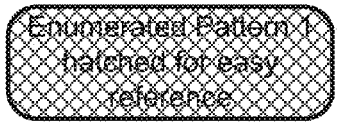
FIG. 5 is an example of an in-band login operation grid using the credentials from FIG. 3.
Figure 5:
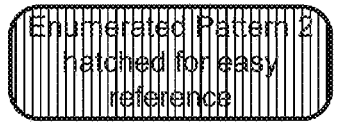
Figure 5:
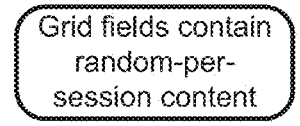

In step 102 the user looks at the digital content of the first enumerated position of the first credential In step 103 this digital content is the position based challenge for the second credential In step 104 the user goes to the enumerated position specified by the challenge in the second credential and gets the digital content In step 105 in this position is digital content that is now the content based challenge back to the first credential In step 106 the user goes back to the first credential and looks for the value of the challenge In step 107 the position in the first credential where the digital content matches the challenge is the response In step 108 the user performs the instructions for all of the challenges In step 109 once all the responses have been determined, the response is sent to the server In step 110 the server responds with a is/is not authenticated signal An illustrative example of the above steps with a real grid and numbers will be shown to further clarify the art. In step 100 the user contacts the server with their unique identifier. In step 101 the server responds with a randomized grid. For this example FIG. 5 will be used as a reference for the grid and its random session only digital content. FIG. 3 has the explicitly numbered enumerated positions of the two credentials. FIG. 5 has the two credentials highlighted for the purpose of making the example easier to follow. Clearly, during a login session they would not be shown. In step 102 the user looked up the first challenge position in the first credential. The first enumerated position in the first credential has a digital content value of 5 in it. For step 103 the number 5 is now the position based challenge for credential two. In step 104 the user goes to the 5$^{th}$ position in credential number two and gets the digital content which is 3. In step 105 the digital content of 3 is now the content based challenge back to credential one. In step 106 the enumerated position in credential one that matches content challenge of 3 is the enumerated position 4. For step 107 the enumerated position of 4 is now the first response. Steps 102 to 108 will be performed until all the challenge positions are completed. There are many different ways the number of challenges can be set up between the user and server. For in-band examples, the number of challenges could be shown in the clear or it could be a pre-set number of challenges (for example, there would always be 5 challenges). Once all of the challenges have been completed, step 109 is to send all of them to the server for verification. In step 110 the server authenticates or rejects the user based on their reply.

Figure 6:
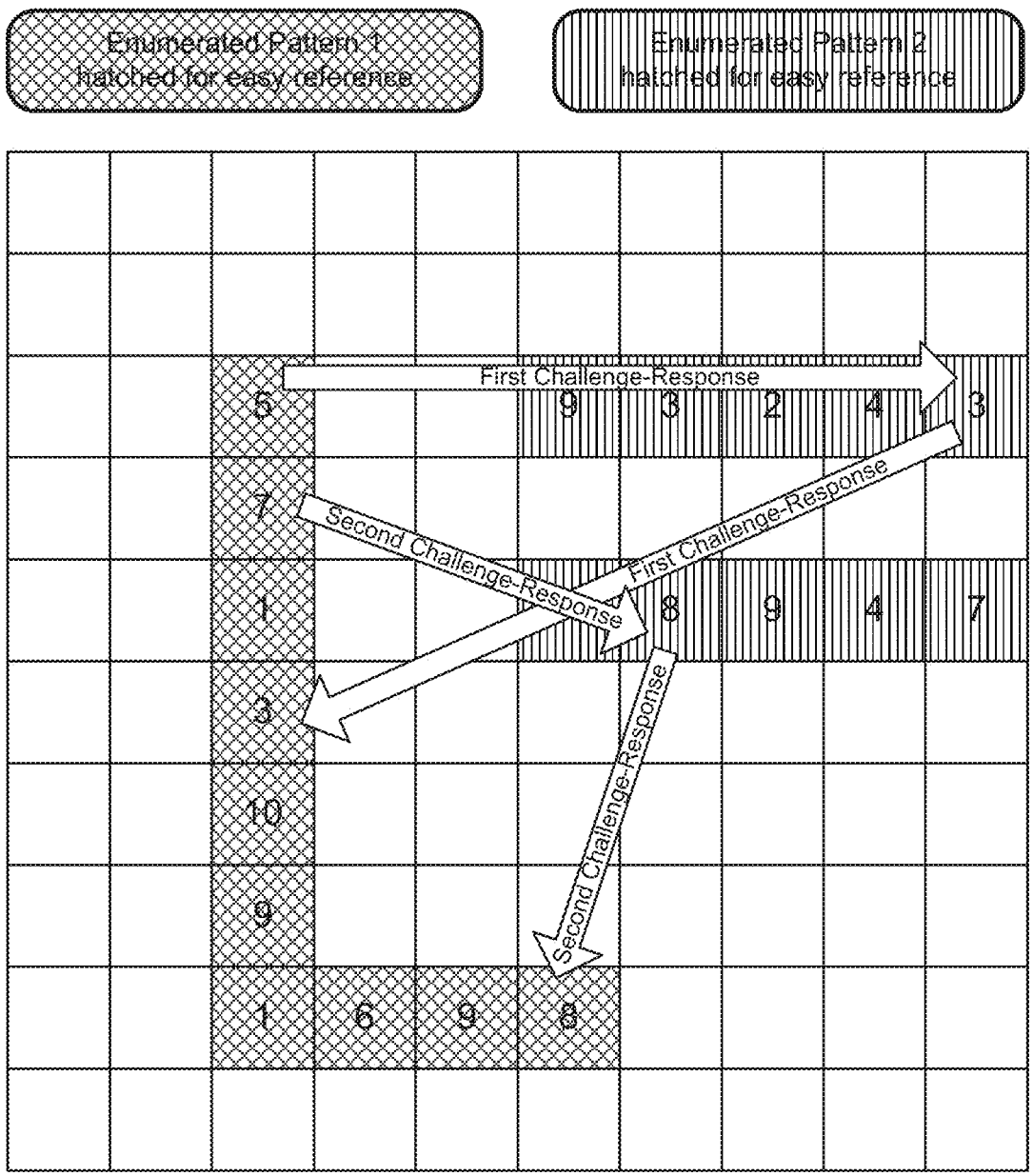
FIG. 6 is a visual flowchart of the interaction between credentials.

FIG. 6 is a visual flowchart that shows the interaction between the two credentials for the first and second challenge positions.

Advantage of Using an in-Band Enumerated Position-Based Challenge and an Enumerated Position-Based Response The login operations in U.S. Pat. Nos. 7,188,314 and 7,073,067 both contain an enumerated position and a digital content value. In the first case according to U.S. Pat. Nos. 7,188,314 and 7,073,067, the challenge is the enumerated position and the response is the digital content. In the second case according to U.S. patent application Ser. No. 13/658,800 filed in the U.S. Patent and Trademark Office by the same inventors and at the same time as the current application (Our File No. AIDT 1014-1), the challenge is the digital content and the response is an enumerated position. There is a significant, and highly beneficial, advantage to use the enumerated position as the both the challenge and the response. Anytime a digital content value is used, either as challenge or response, it opens an attack vector that can be used to break the credential. This may take many sessions of accrued data, but ultimately it can be done. U.S. patent application Ser. No. 13/658,800 filed in the U.S. Patent and Trademark Office by the same inventors and at the same time as the current application (Our File No. AIDT 1014-1) described the manner that both position based challenge content based response and content based challenge and position based response can be broken. The position based challenge and content based response method uses the content as a response so that all an attacker must record is the browser session to be able to break the credential, even if the challenge is sent out-of-band. The content based challenge and position based response method is much more secure since there is a significant, and highly beneficial, advantage to use the position as the response. However, even in the most secure embodiment of that method—where the challenge is sent out-of-band and an in-band only attack vector can't break the credential—if the out-of-band channel is compromised, the credential can be broken. It is difficult to preempt out-of-band channels, but it can be done thus showing the weakness of having a content based challenge.

The core of the problem is that if an attacker gets a hold of the grid with randomized digital content and either a challenge or response that is digital content, they can begin to build a data map that will, after a certain critical mass of accrued sessions, be able to break the credential. The solution is to make the digital content unavailable to an attacker during the login operation. Thus the enumerated position based challenge and enumerated position based response.

When using algorithms as described herein, there are no attack vectors that can be used to break the credential during an in-band login operation. Analyzing the pieces of data the attacker can see: a grid with randomized data and an enumerated position based response. The grid is meaningless unless there is digital content that can be mapped to it or there is a correlation between the challenge and the response that can be tracked in some manner by the data in the grid. The position based response is something that is intangible on the client side during the login operation because it exists only as a construct in the users head. In this invention there is nothing to correlate the challenge (which is also an intangible construct on client side during a login operation) and response to anything in the grid.

To analyze the security a bit further lets further list what the user and a potential attacker has access to.

The attacker could have access to:
The user's unique identifier (this is important when accruing data since it's only valid for a given user
The session's grid with randomized digital content
The position based response.
The user has access to:
The first credential
The second credential
The position based challenge from the first credential
The content based response from the second credential (*)
The content based challenge from the second credential to the first credential (*)
The position based response from the first credential The credentials and the position based challenge and response does not have a physical construct on the client side during the login operation. The two items marked with asterisks (*) are seen in the clear in the relevant prior arts, either as a response or challenge. However, in this invention the digital content is a part of an instruction set that the user does mentally. So, in this art, it is also intangible in a sense that an attacker does not, and cannot get, access to the digital content. Even all in-band, there is nothing concrete for the attacker to save and mine since everything is intangible existing only as positions or values in the users mind that are acted upon.

Out-of-Band Authentication Method of Enumerated Position-Based Challenge and Enumerated Position-Based Response For this embodiment, a grid is sent to the in-band client (browser) and a different grid is sent out-of-band. This grid can be sent out-of-band in many different ways. For example, it could be a MMS message, an email, a soft client, or a hardware token made for displaying grids. For this embodiment, we will assume the user has a soft token, a program running on a smart phone, which has been registered with the server and generates grids in a time synchronized manner. Those skilled in the art would recognize that this is merely one of many ways to send/synchronize out-of-band data between a user and a server.

Figure 7:
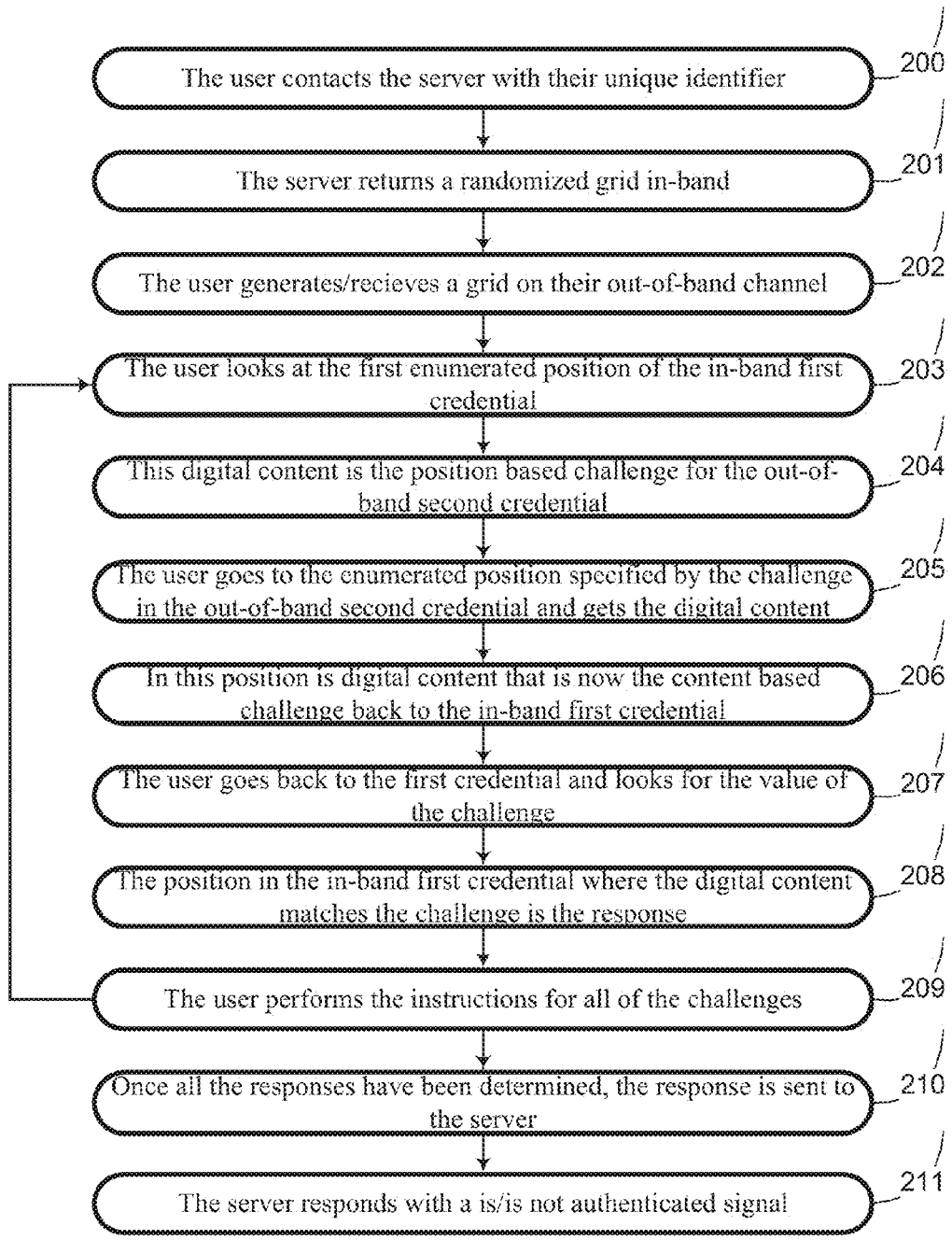
FIG. 7 is a flowchart of an embodiment of the out-of-band login operation.

The algorithmic steps for the login operation of the out-of-band embodiment of this invention are as follows and are also shown in FIG. 7:

In step 200 the user contacts the server with their unique identifier
In step 201 the server returns a randomized grid to the in-band client
In step 202 the user generates a grid on their soft-token
In step 203 the user looks at the digital content of the first enumerated position of the first credential in the in-band grid
In step 204 this digital content is the position based challenge for the second credential in the out-of-band grid
In step 205 the user goes to the enumerated position specified by the challenge in the second credential in the out-of-band grid and gets the digital content In step 206 in this position is the digital content that is now the content based challenge back to the first credential in the in-band grid
In step 207 the user goes back to the first credential in the in-band grid and looks for the value of the challenge
In step 208 the position in the first credential in the in-band grid where the digital content matches the challenge is the response
In step 209 the user determines the response for all of the challenges
In step 210 once all the responses have been determined, the response is sent to the server
In step 211 the server responds with a is/is not authenticated signal An illustrative example of the above steps with a real grid and numbers will be shown to further clarify the art. In step 200 the user contacts the server with their unique identifier. In step 201 the server responds with a randomized grid. In step 202 the user generates their out-of-band grid. For this example FIGS. 8A and 8B will be used as a reference for the grids and their random session only digital content. FIG. 3 has the explicitly numbered enumerated positions of the two credentials. FIGS. 8A and 8B have the two credentials highlighted on their respective grids for the purpose of making the example easier to follow. Clearly, during a login session they would not be shown. In step 203 the user looked up the first challenge position in the first credential. The first enumerated position in the first credential has a digital content value of 6 in it. For step 204 the number 6 is now the position based challenge for credential two. In step 205 the user goes to the $6^{th}$ position in credential number two and gets the digital content which is 10. In step 206 the digital content of 10 is now the content based challenge back to credential one. In step 207 the enumerated position in credential one that matches content challenge of 10 is the enumerated position 7. For step 208 the enumerated position of 7 is now the first response. Steps 203 to 209 will be performed until all the challenge positions are completed. There are many different ways the number of challenges can be set up between the user and server. For in-band examples the number of challenges could be shown in the clear or it could be a pre-set number of challenges (for example, there would always be 5 challenges). Once all of the challenges have been completed, step 210 is to send all of them to the server for verification. In step 211 the server authenticates or rejects the user based on their reply.

Advantage of Using an Out-of-Band Enumerated Position-Based Challenge and an Enumerated Position-Based Response The actual algorithmic steps for the user to perform between the two credentials are the same as the in-band steps.

That is to say that the user performs the same instructions, but instead of going between two credentials on the same grid they go between two credentials on different grids. Out-of-band for this art is important in the industry because it adds a what-user-has factor of authentication. The security of the credential is the same as that in the in-band case and the same analysis applies to out-of-band. Ultimately, an attacker has nothing concrete to mine and thus cannot break the credential. However, this art's out-of-band is an improvement over the prior art, U.S. patent application Ser. No. 13/658,800 (AIDT 1014-1), out-of-band embodiment. In the prior art, if the out-of-band channel is preempted then the digital content challenge can be seen. Once the digital content based challenge is known, along with the corresponding session's grid data, an attacker can begin to build a data map that can be used over many sessions worth of data to break the credential. While it is difficult to compromise an out-of-band channel, it can be done. The compromise of an out-of-band channel can be a valid attack vector. This invention does not share the same vulnerability. For this art, even if the out-of-band channel is compromised, it does not matter. As in the in-band case, the attacker has access to no data that can be used to break the credential. So even if a user lost their token or if the what-user-has is an email account (which is not very secure), it does not matter because even if the out-of-band grid is seen in the clear, it leaks nothing about either of the credentials.

A Note on the Possible Field Contents of the Grid

There can be multiple types of content in the fields of the grid and they do not need to be the same. Each field must have digits as one of the two types of content in the fields. This is because the first challenge from the first credential to the second credential is a position based challenge that points to a certain enumerated field on the enumerated pattern credential, so it must be a numerical digit. However, the challenge from the second credential back to the first credential can be anything since it is a content based challenge. E.g., it could be colors, images, shapes, audio- and/or video-bits, etc.

Looking at an example using the following two credentials, which would be hidden in a 7×7 grid with the random session specific color/numerical digit content distribution.

The legends for the colors are:
r—red, o—orange, y—yellow, g—green, b—blue, l—light-blue and v—violet The enumerated positions for both credentials, from left to right fields, are 1 to 7 (the upper line). The middle line represents credential one and the bottom line represents credential two. An example of the random session specific content is:

| Enumerated field positions: | 1 | 2 | 3 | 4 | 5 | 6 | 7 |
| --- | --- | --- | --- | --- | --- | --- | --- |
| Digital/color content (credential one): | 3/r | 7/o | 2/y | 1/l | 4/g | 6/b | 5/v |
| Digital/color content (credential two): | 2/y | 5/v | 1/g | 7/r | 6/b | 4/o | 3/l |

So, the first challenge position is the first enumerated position in the first credential. In this case the challenge is the number 3. The response in the second credential (the content of the 3rd field) is 1/g. Now the color is used for the content based challenge. In this case it is g, or green. Matching the content back in the first credential, the enumerated field that has the color green in it is the 5th field.

Clearly, the color could be replaced with any type of content including images, shapes, audio bites, etc.

Potential Practical Business Applicability, Repercussions, and Ramifications

This shift in authentication paradigm, especially in the in-band case, is beneficial in any business, either enterprise or consumer, where the security of a user's credential is paramount. Google's Analytics and Gmail services are already either mandating (Analytics) or proposing (Gmail) users to switch access to their accounts to a two-factor authentication including an out-of-band mobile device based authentication factor. With the current development of digital wallets by key technology and business giants and initial advances in federated identity practices, by letting people with say Google or Yahoo, or Twitter, or LinkedIn accounts to enter say Facebook or eBay, points to the way that future consumer payments and other transactions having legal and financial responsibility will first of all rely on the security of out-of-band authentication protocols and algorithms. Any company/business would prefer authentication be done in-band since it is easier on the user and easier to manage. The only reason out-of-band is used is because there's no in-band factor with the security that is needed. With this invention, big companies would not have to use an out-of-band channel to provide for the security of their login operations. Even in-band, this arts algorithm is secure. This is a large step forward for in-band authentication where it can be claimed that a credential's security is just as good in-band as out-of-band and can have significant ramifications in the industry.

Additionally this type of credential can be used to protect and/or authorize transactions with much more user and business assurance that the credential and the authorized transaction are safe. Truly, in any scenario where the user's credentials need to be secure, the art described in this invention is applicable. This applies especially in a case where out-of-band is ineffective (for example, a large geographic distance with a time synchronized token), impossible (for example, a token that talks to a server when no connection can be made), or unwanted (out-of-band can be very costly) while still giving a business the security it needs.

There are many applications for a knowledge based credential that does not leak any of the credential. Many enterprises and consumer businesses that need users to authenticate to get access to resources and/or save or process sensitive personal information rely on the security of said credential for everything. If the credential is lost, then everything in the account is compromised. One of the very common tactics that is used is to have the user reset their credentials, for the sake of an example, once every three months (this time period can be more or less depending on how much security the contents of the account necessitate). The constant credential churn creates an environment where it is extremely difficult for the user to remember their credentials, especially if there are stringent restrictions on the creation of those credentials. With this invention, with the out-of-band challenge the need for resetting credentials is gone. Users can pick, remember, and reuse indefinitely a single credential without worry of compromise.

Network Architecture, Physical Infrastructure, and User Interfaces

Figure 9:
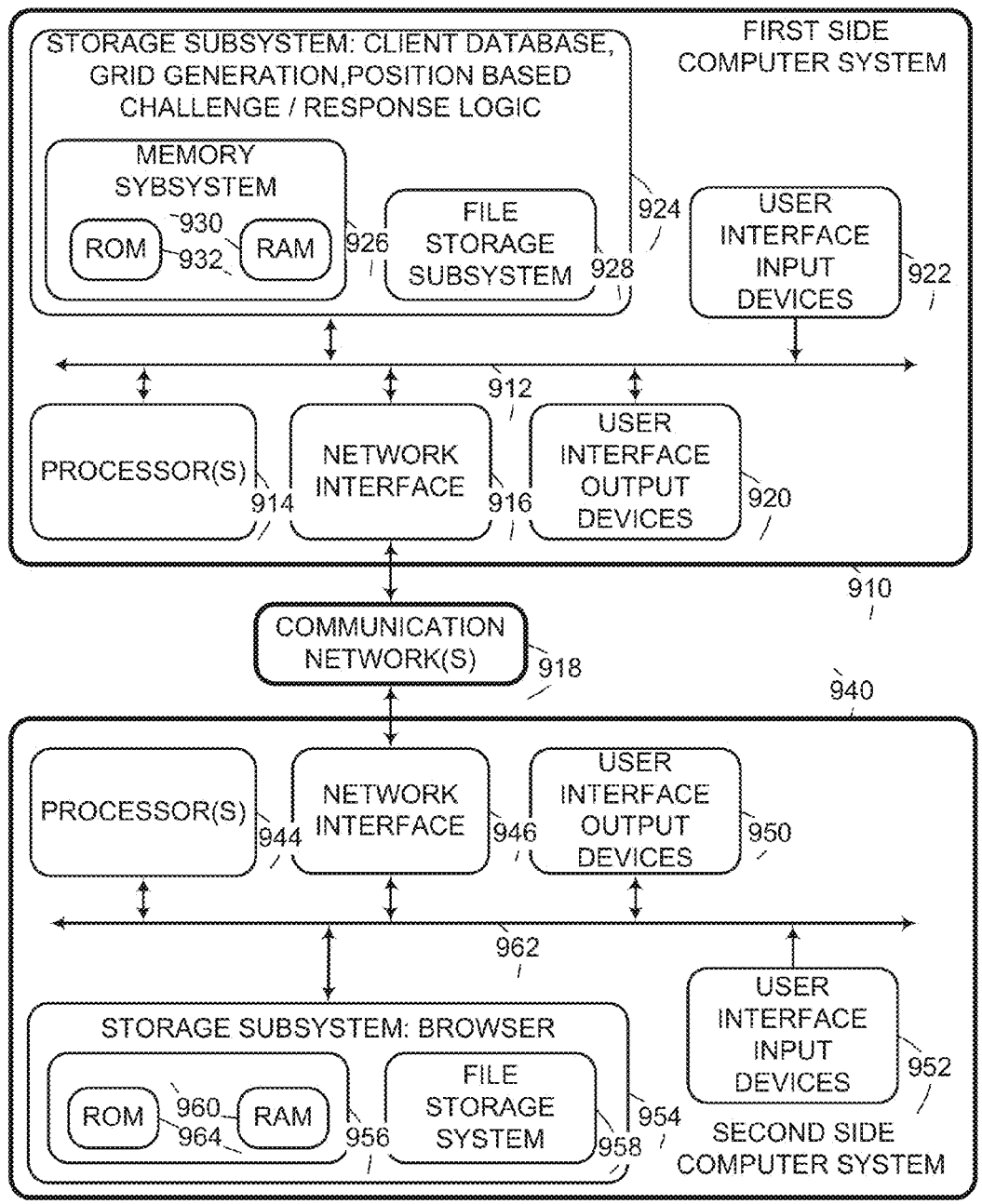
FIG. 9 is a simplified block diagram of a client/server system coupled via a network communication protocol.

FIG. 9 is a simplified block diagram of a first computer system 910 and a second computer system 940 coupled via a communication network 918 or channel, suitable for use in authentication processes described herein. The first computer system 910 typically includes at least one processor 914 which communicates with a number of peripheral devices via bus subsystem 912. These peripheral devices may include a storage subsystem 924, comprising a memory subsystem 926 and a file storage subsystem 928, user interface input devices 922, user interface output devices 920, and a network interface subsystem 916. The input and output devices allow user interaction with computer system 910. Network interface subsystem 916 provides an interface to outside networks, including an interface to communication network 918, and is coupled via communication network 918 to corresponding interface devices in other computer systems. Communication network 918 may comprise many interconnected computer systems and communication links. These communication links may be wire line links, optical links, wireless links, or any other mechanisms for communication of information. While in one embodiment, communication network 918 is the Internet, in other embodiments, communication network 918 may be any suitable computer network. Likewise, the second computer system 940 typically includes at least one processor 944 which communicates with a number of peripheral devices via bus subsystem 962. These peripheral devices may include a storage subsystem 954, comprising a memory subsystem 956 and a file storage subsystem 958, user interface input devices 952, user interface output devices 950, and a network interface subsystem 946. The input and output devices allow user interaction with second computer system 940. Network interface subsystem 946 provides an interface to outside networks, including an interface to communication network 918, and is coupled via communication network 918. The second computer system 940 may be embodied by smart phones, tablet computers, laptop computers or other systems capable of executing procedures as described herein.

User interface input devices 922, 952 may include a keyboard, pointing devices such as a mouse, trackball, touchpad, or graphics tablet, a scanner, a touch-screen incorporated into the display, audio input devices such as voice recognition systems, microphones, and other types of input devices. In general, use of the term "input device" is intended to include all possible types of devices and ways to input information into computer systems 910, 940 or onto communication network 918.

User interface output devices 920, 950 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image, a video signal or an IPTV stream. The display subsystem may also provide a non-visual display such as via audio output devices. In general, use of the term "output device" is intended to include all possible types of devices and ways to output information from computer systems 910, 940 to the user or to another machine or computer system.

Storage subsystem 924 stores the basic programming and data constructs that provide the functionality of some or all of the processes described herein, including the executable instructions. These software modules are generally executed by processor(s) 914. When the programming and data constructs are combined with other resources in the computer systems 910, 940, the computer systems include logic to perform the functions described herein, on both the server and client sides.

Memory subsystems 926, 954 typically include a number of memories including a main random access memory (RAM) 930, 960 for storage of instructions and data during program execution and a read only memory (ROM) 932, 964 in which fixed instructions are stored. File storage subsystems 928, 958 provide persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystems 928, 958.

Bus subsystems 912, 962 provide a mechanism for letting the various components and subsystems of computer systems 910, 940 communicate with each other as intended. Although bus subsystems 912, 962 are shown schematically as a single bus, alternative embodiments of the bus subsystem may use multiple busses.

Computer systems 910, 940 can be of varying types including a personal computer, a portable computer, a workstation, a computer terminal, a network computer, a smart phone, a television, a mainframe, or any other data processing system or user device. The computer systems 910, 940 will in many embodiments be different from one another. Due to the ever-changing nature of computers and networks, the description of computer systems 910, 940 depicted in FIG. 9 is intended only as a specific example for purposes of illustrating the preferred embodiments. Many other configurations of computer systems 910, 940 are possible having more or less components than the computer system depicted in FIG. 9.

The first and second computer systems 910 and 940 are configured in this example as a client-server system including authentication resources for the enumerated pattern credential authentication and login functions using two-pattern, position-based authentication technology. The second computer system 940 can be a platform for a client subsystem including data entry devices (keyboard, mouse, voice input, etc.), a display device (CRT, LCD panel, mobile communication device, etc.), and a physical platform (personal computer, hand-held computer, internet appliance, etc.) including a processing unit, memory, and other data processing resources. Software running in the client includes a browser or a "thin" software client such as may be provided on personal digital assistants, mobile phones, and other simple Internet appliances which may not support full browser functionality. The browser can include for example a Java Virtual Machine or a .NET environment which supports the client-server dialogue. Likewise, the "thin" software client may support the client-server dialogue. Finally, an interface to the network communication media is provided. The communication media may be a private or public, local-area network or a wide-area network using wired, wireless or optical media in representative systems.

The first computer system 910 can be a platform for a server subsystem configured such as a server-configured computer, a server farm, a computer and data storage system with database capabilities and other single-site and distributed-site server-side configurations. The platform can include network server resources, an account management utility for the user accounts subject of the authentication process, and a platform including a processing unit, memory, disk space and other data processing resources. A core program supporting the authentication process is included in the server subsystem, which can be used for management of access to a protected network destination which controls access to resources such as secure web sites identified by URLs, links to secure networks, etc. The core program may be implemented using Java or .NET object-oriented technology for example. Also, a server database (or a directory service, such as LDAP) and database connector can be included. In some embodiments, the server and server data are implemented with security features to protect user account information files from intruders. A protected network destination controls access to resources such as secure web sites identified by URLs, links to secure networks, etc.

Figure 10:
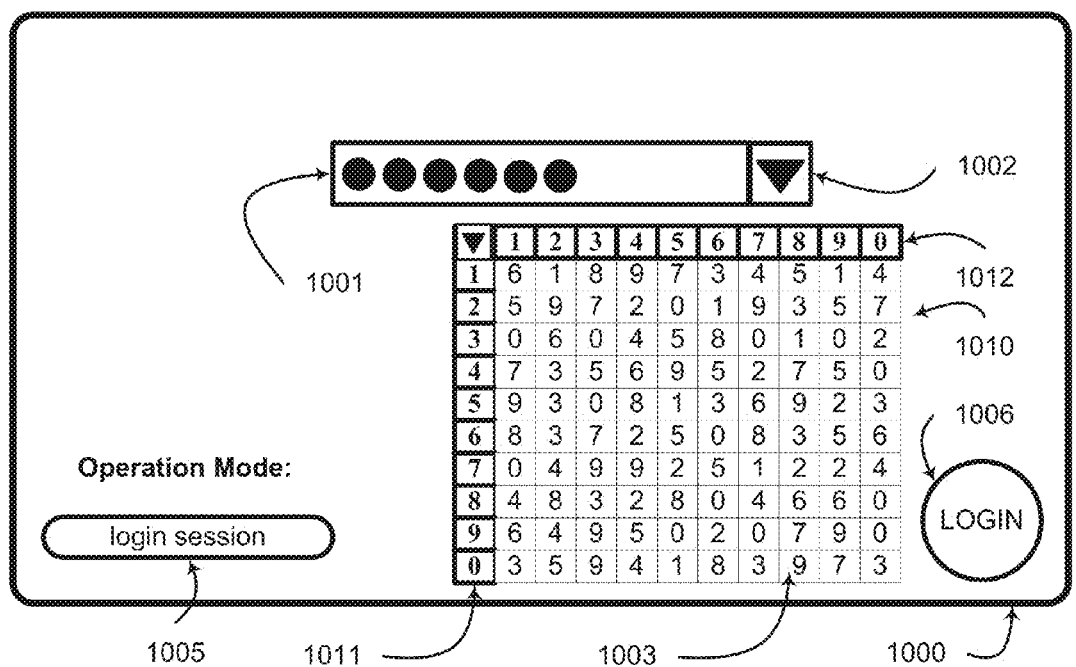
FIG. 10 is a client side an authentication Graphical User Interface (GUI) enabling an in-band enumerated patterns based two-credential one-factor user authentication system which is utilizing during one session credential interactions employing position based challenge and content based response, and content based challenge and position based response.

FIG. 10 illustrates an example of a graphical user interface screen 1000, which can be presented in an authentication session, as described herein. The graphical user interface screen 1000 can be rendered by a browser at the client platform using an electronic document expressed using a markup language with embedded scripts or links to embedded scripts, which can be delivered to the client from the server, after for example, the user identifier has been entered and accepted by the server. Alternatively, the graphical user interface screen 1000 can be rendered by programmatic code compiled into a machine executable file (for example, a C or C++ program) or programmatic code compiled into intermediary code that executes inside a virtual machine (for example, a C# or Java program). A data entry field 1001 is presented, which includes a data entry box. Also, a grid pull-down button 1002 is presented. Selection of the grid pull down button 1002 induces the system to display an instance of the grid 1010 in this example. The interface screen 1000 also includes a status field 1005 indicating the operating mode of the authentication system, and a "login" button 1006.

The instance of the grid 1010 in this example includes an array of characters that are members of a character set consisting of the digits 0-9 in the locations of the grid as discussed above. In this example, optional row and column markers 1011 and 1012 are illustrated along the right side and top side of the grid 1010, which assists the user in navigating the grid. Thus, a character at the point 1003 with coordinates (8, 0) is the character 9.

The interface screen 1000 includes a graphical representation of an instance of the grid, in which the first and second enumerated patterns can be located by the user. The server can simply generate the content for the instance of the grid. The user selects characters at locations in the first enumerated pattern to identify locations in the second enumerated pattern, and then matches the characters at the identified locations in the second enumerated pattern with locations in the first enumerated pattern at which matching characters are disposed. The user then inputs the numbers of the identified locations in the input field 1001 on the interface 1000, and then hits the "login" button 1006. This invokes a process to send the input to the server, where the authentication logic determines whether a match has occurred.

Figure 2:
FIG. 2 is an example of a login operation grid.
Figure 2:
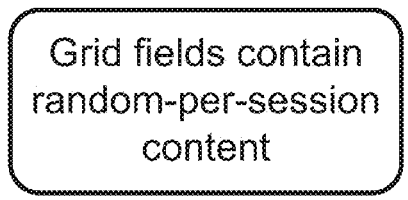

The grid 1010 comprises an instance of a frame of reference, such as shown in FIG. 2 or 4, where the locations on the grid are populated by a randomized array of characters, selected from a character set. The character set in this example consists of the ten digits 0-9. Of course, other character sets having any practical number N1 of members may be used as suits a particular embodiment, where the character sets may include alphabetic characters, numerical characters, punctuation characters, colors, icons or other images, audio clips, audio-visual bites, and so on. In preferred systems, the grid having a number N2 of locations includes multiple instances of each character in the character set, so that any one character does not identify a single location on the grid. In the illustrated example, there are 10 instances of each of the 10 digits 0 to 9 on the 10×10 grid, where the number N1 is 10 and the number N2 is 100. Thus, this example is representative of a class of grids, where the character set consists of a number N1 of characters, and the frame of reference includes a number N2 of field locations, where N2 is equal to or greater than a multiple M times N1, and the multiple M is 0 in this example. Extrapolating, the geometry of the grid does not need to be 10×10, it can be anything (e.g., 3×8 or 15×5). Nor does the total number of fields have to be 100, which means that the grid could also be for example, 5×5.

A grid having redundant content can be defined as a grid in which any particular character in a character set can be found as an entry option in at least two random fields on a grid. So if the number of fields on the grid is N2, and the number of different characters (could be digits, or letters, etc.) is N1, then N2=M×N1, where M=2 at a minimum. As a matter of principle, this configuration could be sufficient. However, as far as the best practical security level is concerned, it is better to have M>2 (say equal to 5, or 10) so that each character can appear in the grid more than twice. This is a design tradeoff between usability, security, and GUI real estate options. Another consideration in specifying the instances of the grid involves the number of times that a particular character appears in the grid. In the purely random case, it is possible that a given character from the character set could occupy a large number of locations on the grid, which might affect security. For example, consider a grid having the N2 equal to 20 arranged in a 2 by 10 grid, and using the character set of digits 0 to 9 (N1 equal to 10) and M equal to 2. An instance of the grid may have a particular digit, say digit 9, occupying any number of locations, such as 11 out of 20. This would leave the other 9 digits to the nine remaining locations. Such a case would be degenerate and unacceptable, because of the lack of redundancy on the grid of all the characters. Other degenerate eases can be found as well in a purely random case. For example, another degenerate case could occur in a 10 by 10 grid, the digit 9 might occur 91 times, and the other characters only once. So, it is preferred that each instance of the grids used have the additional characteristic that each particular character in the character set occur in the instance in at least two locations. This would require for a 10 by 10 grid with a 10 member character set, the each character occurs at least twice, and the maximum times that a particular character could occur would be 82 times. For improved security, for a 10 by 10 grid using a 10 member character set, the minimum number of times that each character occurs in the instance of the grid can be specified to be 4 or more. This type of limitation provides for a certain variation in each character redundancy but does not allow for any ridiculous extremes in that. In summary, the conditions providing certain variations in each character redundancy R and eliminating security deficient distributions of each character on the grid can be expressed as $(M-T)<=R<=(M+T)$, where R and T are security parameters with $M=>2$ and $1<=T<=(M-1)$, ($T_{min}=1$, $T_{max}=(M-1)$). Hence, the redundancy variations would depend on the value of the parameter $T_{min}<=T<=T_{max}$ for any given M. Two tables below show the redundancy variation range for each character on a grid with respect to M and Tmax, and M and Tmin:

TABLE 1

| M | Tmax | R |
|---|---|---|
| 10 | 9 | 1-19 |
| 5 | 4 | 1-9 |
| 2 | Tmin = Tmax = 1 | 1-3 |

In Table 1, R is calculated with expression $(M-T_{max})<=R<=(M+T_{max})$. As can be seen, each character has a quite wide R variation, which provides rather an irregular pattern, than a random distribution. Indeed, R=1 actually means no redundancy at the minimum R range and too much redundancy for characters which happened to pick up redundancy values at the upper range. Both extreme cases which can happen for a certain subset of characters on the grid would somewhat reduce the overall security of the content distribution on the grid.

TABLE 2

| M | Tmin | R |
|---|---|---|
| 10 | 1 | 9-11 |
| 5 | 1 | 4-6 |
| 2 | Tmin = Tmax = 1 | 1-3 |

In Table 2, R is calculated with expression (M−Tmin)<=R<=(M+Tmin) which is actually (M−1)<=R<=(M+1). As can be seen, each character has a quite narrow R variation, which provides rather a random pattern of content distribution than rather irregular distributions from Table 1. Also, higher values of M lead to better overall security as R variation range becomes a great deal smaller than in Table 1 for the same values of M. The important case of M=2 is similar in both tables and it leads to a certain subset of characters not having any redundancy at all if R=1. Therefore, in order to preserve redundancy variation for each character and improve overall security of the content distribution on the grid, the condition M=>3 should be always in place, the bigger M the better for security (typically, it is a tradeoff between security and user interface footprint). If case M=2 is an important tradeoff in preserving the smallest grid size for a given set of characters, the redundancy value R=2 should be mandatory for all characters in the random content distribution, that is no R variation would be allowed in such a case.

A different instance of the array of characters can be produced for each instance of the reference grid 1010. The different instances of the array of characters can be generated randomly, or pseudo-randomly, in some embodiments, with minimum constraints on redundant use of each character in the character set. Alternatively, a set of previously generated grids of characters can be utilized in random order. Other techniques can be utilized for making the presentation of the grids of field contents variable to strengthen the authentication factor. The instances of the grid can be generated at the server, and sent to the client, or they can be generated at both places using synchronized algorithms.

The instance of the grid, and indeed any random instance of the grid can be characterized by the fact that locations at one or more of the numbered positions in the first enumerated pattern (e.g. positions 1 through 4 on pattern 1 of FIG. 3) are populated by characters (characters 5 7 1 3 in pattern 1 of FIG. 5) in said instance identifying a session specific set of numbered positions (positions in pattern 2 of FIG. 3 identified by characters 5 7 1 3) along the second enumerated pattern, and characters in the locations at the session specific set, of numbered positions in the second enumerated pattern (characters 3 8 9 2 in pattern 2 of FIG. 5) appear in locations on said instance at one or more numbered positions in the first enumerated pattern (locations 4 10 6*X), where X is a rule based value agreed by a rule for instances in which there is no location having a matching character. Also, the asterisk (*) on the 6 is acknowledgement that the character 9 is found in more than one location on the pattern 1, in this case in positions 6 and 9. According to an agreed rule, the position 6 is a rule based value used as it is the lowest position holding the matching character. Other rules can be applied in these cases as well. The authentication logic records this information, either specifically recording the locations (and any rule based values) on the first enumerated pattern which include the characters that match those at the locations in the second enumerated pattern of the session specific set of numbered positions, or by simply saving the instance of the grid during the session for use in the matching process.

The user fulfills the authentication factor by providing the correct response to the challenge, where the response is a sequence of position numbers from the first enumerated pattern. In this case, the challenge can be considered to be the instance of the grid. The user enters in the data entry field 1001 the responses, and then sends the response to the server by selecting, login button 1006 in this example (or hitting an "enter" key, or otherwise). The response identifies a sequence of positions in the first enumerated pattern defined by the user credential data set, by the numbers corresponding to the positions in the pattern of the locations at which the matching characters appear on the instance. If the character in the challenge appears in more than one location having a position on the enumerated pattern credential or the character in the challenge does not appear at all in a position of the enumerated pattern credential, then a rule can be applied to determine the correct response.

Using this interaction between the server and the client, the server can accept input data from the client in response to the instance of the grid, where the input data including the response identifies a sequence of positions in the enumerated pattern.

Thus, for the instance of the grid shown in FIG. 10, assuming that the first enumerated pattern is Pattern 1 from FIG. 3, and the second enumerated pattern is Pattern 2 from FIG. 3, and assuming that the first four positions in Pattern 1 are the agreed challenge locations, the session specific set of locations is (0 5 0 7). We will use the character "0" to identify the numbered location "10" for this example. The characters disposed in those locations in the Pattern 2 are (3 2 3 6). The locations in Pattern 1 including these characters, and required for successful authentication become (6 0 6 X) (Using the digit "0" to identify the position "10"). The "X" indicates that a character in the session specific set of locations on the second pattern is not present in the first enumerated pattern. The value of "X" is determined from an agreed rule. For, example according to one rule, where, then the agreed response character can be "1," in place of the "X."

Then the input fields are fulfilled by inputting to the data entry field 1001 the field position numbers along the enumerated pattern credential at which the characters (3 2 3 6) appear. The input data in the data entry field 1001 are veiled by echo dots in FIG. 10 for security reasons in an attempt to reduce credential entropy leakage over a number of authentication sessions.

Figure 11:
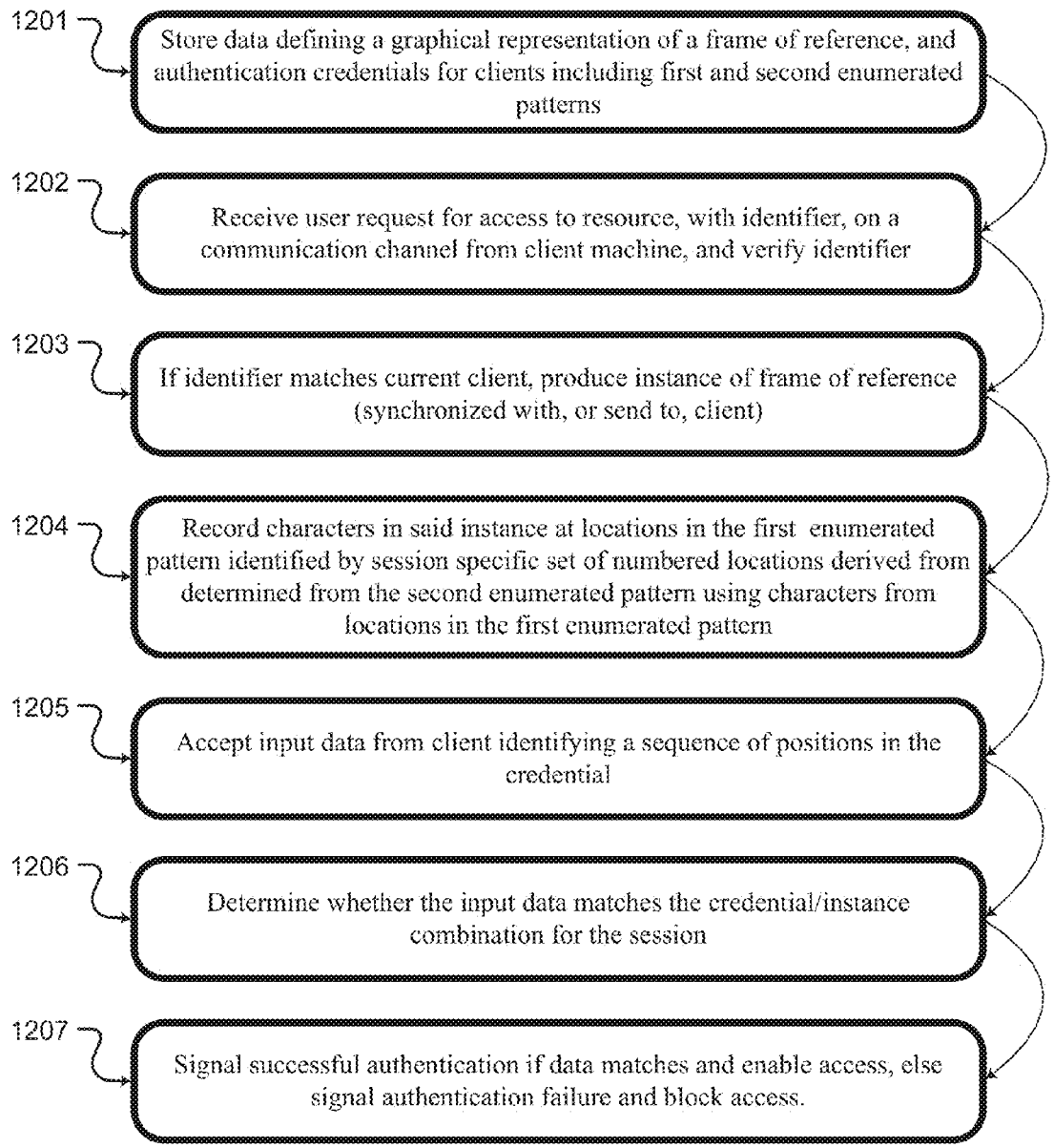
FIG. 11 is illustrating server side logical functions for a two enumerated pattern credential based in-band user authentication system.

FIG. 11 illustrates server side functions for a two enumerated pattern credential-based authentication system as described herein. From the server-side, the method includes storing data defining a graphical representation of a frame of reference adapted for rendering on the display, such as the grids illustrated above, along with authentication credentials including first and second enumerated patterns (1201). Such data defining a graphical representation can consist of an implicit definition that is based on the logic used to produce instances of the frame of reference, or an explicit definition that can comprise a markup language description of a graphical object that can contain or be merged with an array of characters to be used in authentication sessions. The frame of reference includes locations in the frame of reference having coordinates on the frame of reference, such as the fields at the identified rows and columns of the grid. A session can be begun upon receiving a user request for access to a resource for example, which carries an identifier of the user, on a communication channel from a client machine, and verifying the user identifier (1202). If the user identifier matches a current client, then an instance of a frame of reference is produced for the current session This instance of the frame of reference, including a randomized array of characters, can be generated using an algorithm that is synchronized with a corresponding algorithm executed by a client machine, or it can be generated on the server side, and sent to the client as discussed above (1203). The server side then records characters in said instance at locations in the first enumerated pattern identified by session specific set of numbered locations derived from determined from the second enumerated pattern using characters from locations in the first enumerated pattern (1204). This step of recording can for example, involve deriving and saving the correct location numbers and rule based values using the first and second enumerated patterns in the user credentials, or it can involve saving a copy of the complete instance. As a next step from the server-side, input data is accepted from the client that identifies a sequence of positions in the enumerated pattern credential (1205). The server-side resources then determine whether the input data matches the credential/instance combination for the current session (1206). Next, a successful authentication is signaled if the data matches, enabling the process to proceed to a next tier of authentication, or to enable access to the requested resource as suits a particular implementation. If the data does not match, then an authentication failure can be signaled and access can be blocked (1207).

The functions described with reference to FIG. 11 can be implemented by a computer program or programs stored in the server storage system that, upon execution by the server-side data processing machine, implement corresponding logic. Likewise, a computer program or programs can be stored in a non-transitory machine-readable data storage medium, or other computer memory.

From the client side, complementary functions are executed. Such functions can in some embodiments include displaying a graphical user interface by rendering an electronic document delivered from the server. The graphical user interface can display the session instance of the frame of reference, as discussed above. The graphical user interface can be rendered by executing the electronic document, including any scripts embedded in the document or to which links are provided in the document, using a browser and any supporting technology on the client side as necessary. In some embodiments, the client-side resources include an algorithm, implemented by client-side software such as scripts provided to the client via the server during a client set-up procedure, that can be synchronized with the server-side resources to generate the per-session instance of the frame of reference in a manner that is synchronized.

For embodiments in which the client has access to a first data processing machine, such as a browser being executed on a laptop or desktop computer, and a second data processing machine such as a browser, e-mail account, SMS text message account or other program being executed on a second platform, such as a mobile phone or the like, the server side resources can include logic to establish a first communication channel including connection between the server-side computer and the first data processing machine, to receive input including the client identifier from the first data processing machine via one or more data communications on the first communication channel; to verify the client identifier received via the first communication channel, and to establish a second communication channel, including a connection between the server-side computer and the second data processing machine, and after verifying the client identifier, sending the session instance of the grid to the second data processing machine via communications on the second communication channel. In this two-channel embodiment, the server-side resources can include logic to accept the input data in response to the session instance of the grid from the first data processing machine via the first communication channel.

In a two channel (also referred to as "out-of-band") embodiment, the server side logic can comprise resources to use one or more frames of reference, where different frames of reference can be used on the different channels, while the client side resources include any necessary complementary logic. Also, in a two channel embodiment, the server side logic can use the same frame of reference for both channels, such as a 10 by 10 grid, while producing first and second instances of the first frame of reference that are populated by different random arrays of characters. Furthermore, in a two channel embodiment, the server side logic can use the same frame of reference for both channels, such as a 10 by 10 grid, while producing first and second instances of the first frame of reference that are populated by a single random array of characters.

Figure 12:
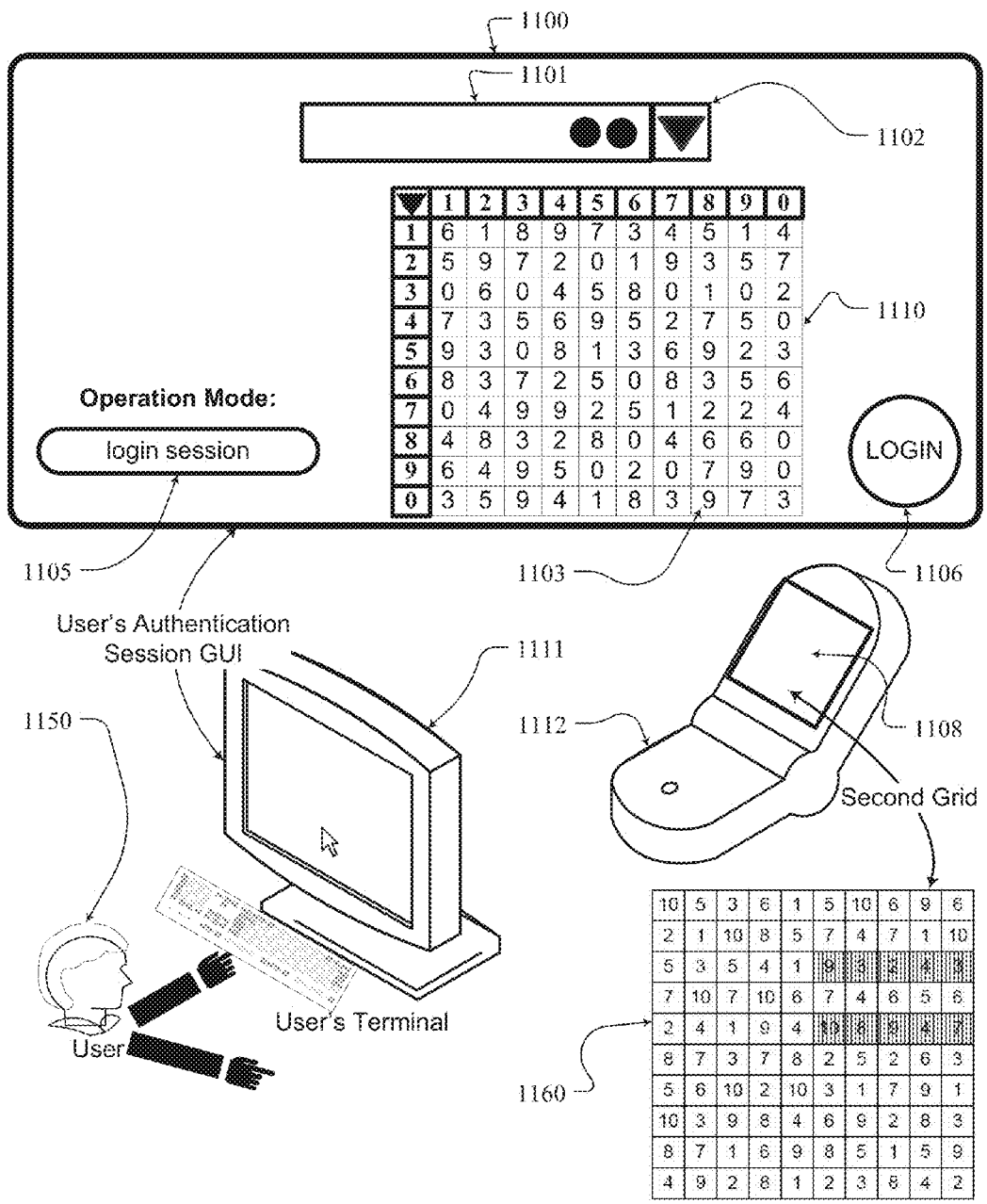
FIG. 12 is a client side an authentication Graphical User Interface (GUI) enabling an out-of-band enumerated patterns based two-credential two-factor user authentication system which is utilizing during one session credential interactions employing position based challenge and content based response, and content based challenge and position based response.

FIG. 12 illustrates a graphical user interface GUI 1100 rendered using a browser (as one example of a first data processing machine 1111) for a login session at which the user 1150 first provides a user identifier to the server, in which one instance 1103 of a frame of reference is delivered via the GUI 1100 on the first data processing machine 1111, and a second instance 1160 of the frame of reference is delivered to user 1150 via a browser, email program, a Short Message Service (SMS) program or other programmatic code compiled and executed on a personal mobile communication device 1112 (as one example of a second data processing machine). This splits the authentication protocol across two communication channels. In an example configuration, the second instance 1160 of a grid is generated by the server and delivered with, for example, to a screen 1108 on a user's personal mobile communication device 1112, while the first instance 1103 of the grid is produced by the user system using a program synchronized with a corresponding program on the host, or is delivered to the user machine 1111, such as a browser, and displayed using the browser on the GUI 1100, or otherwise displayed on a screen of user's terminal 1111.

The GUI 1100 in this example includes presentation of a data entry field 1101, which includes a data entry box. Also, a grid pull-down button 1102 is presented. Selection of the grid pull down button 1102 induces the system to display said first instance 1103 of the grid 1110 in this example. The graphical user interface screen 1100 also includes a status field 1105 indicating the operating mode of the authentication system, and a "login" button 1106, like the interface of FIG. 10. In this example, the first and second instances 1103, 1160 are produced on a single frame of reference that consists of a 10 by 10 array of locations arranged in rows and columns, but have different populations of characters from the common set of characters. In other examples, both instances can have the same populations of characters, and thus in effect be identical instances. In yet other examples, different frames of reference can be used for the different instances, including for example grids having different numbers of rows and/or columns; or for another example frames of reference arranged in a Cartesian manner with locations identifiable by (x, y) coordinates or row and column numbers, and a frames of reference arranged in a polar manner with locations identifiable by angle and radius. Thus, it can be said that the two channel embodiment involves logic that uses instances of one or more frames of reference.

The instance 1103 of the grid 1010 includes digits, or other characters, in the locations of the grid as discussed above. In this example, optional row and column markers 1011 and 1012 are illustrated on the GUI 1100 along the right side and top side of the grid 1010, which assists the user in navigating the grid. Thus, a character with coordinates (8, 0) is the digit 9. On the instance 1160 displayed on the screen 1108 of the mobile communication device 1112, the markers can be omitted to save space.

Figure 13:
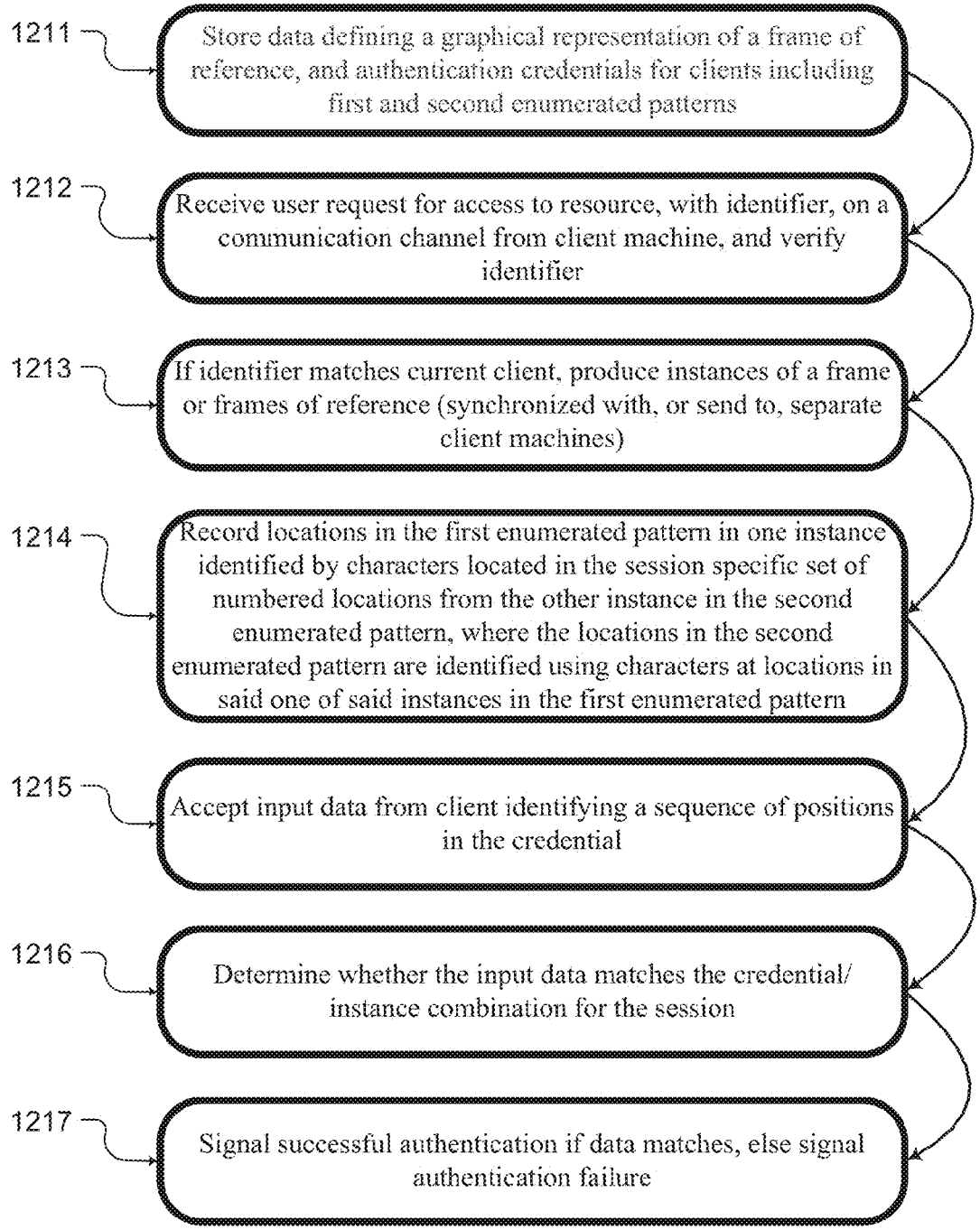
FIG. 13 is illustrating server side logical functions for a two enumerated pattern credential based out-of-band user authentication system.

FIG. 13 illustrates server side functions for a two enumerated pattern credential-based authentication system as described herein. From the server-side, the method includes storing data defining a graphical representation of a frame of reference (one or more) adapted for rendering on the display, such as the grids illustrated above, along with authentication credentials including first and second enumerated patterns (1211). Such data defining a graphical representation can consist of an implicit definition that is based on the logic used to produce instances of the frame of reference, or an explicit definition that can comprise a markup language description of a graphical object that can contain or be merged with an array of characters to be used in authentication sessions. The frame or frames of reference include locations in the frame of reference having coordinates on the frame of reference, such as the fields at the identified rows and columns of the grid. A session can be begun upon receiving a user request for access to a resource for example, which carries an identifier of the user, on a communication channel from a client machine, and verifying the user identifier (1212). If the user identifier matches a current client, then instances of the one or more frames of reference are produced for the current session These instances of the frame of reference, including a randomized array of characters that are members of a character set, can be generated using a logical function on the server side that is time synchronized with a corresponding algorithm executed by a client machine, or they can be generated on the server side, and sent to the client as discussed above. (1213). The first and second instances can be populated by a single array of members of the character set, and thus have to be the same, or can be populated by different random combinations of members of the character set. The server side then records locations in the first enumerated pattern in one instance identified by characters located in the session specific set of numbered locations from the other instance in the second enumerated pattern, where the locations in the second enumerated pattern are identified using characters at locations in said one of said instances in the first enumerated pattern (1214). This step of recording can for example, involve deriving and saving the correct location numbers and rule based values using the first and second enumerated patterns in the user credentials and the first and second instances, or it can involve saving a copy of the complete first and second instances. As a next step from the server-side, input data is accepted from the client that identifies a sequence of positions in the enumerated pattern credential (1215). The server-side resources then determine whether the input data matches the credential/instance combination for the current session (1216). Next, a successful authentication is signaled if the data matches, enabling the process to proceed to a next tier of authentication, or to enable access to the requested resource as suits a particular implementation. If the data does not match, then an authentication failure can be signaled and access can be blocked (1217).

The functions described with reference to FIG. 13 can be implemented by a computer program or programs stored in the server storage system that, upon execution by the server-side data processing machine, implement corresponding logic. Likewise, a computer program or programs can be stored in a non-transitory machine-readable data storage medium, or other computer memory.

From the client side, complementary functions are executed. Such functions can in some embodiments include displaying a graphical user interface by rendering an electronic document delivered from the server. The graphical user interface can display the session instance of the frame of reference, as discussed above. The graphical user interface can be rendered by executing the electronic document, including any scripts embedded in the document or to which links are provided in the document, using a browser and any supporting technology on the client side as necessary. An electronic document used to deliver the session instance of the frame of reference, can include the challenge embedded therein, either directly in the document or via links included in the document. In some embodiments, the client-side resources on one or both of the first and second machines include an algorithm, implemented by client-side software such as scripts provided to the client via the server during a client set-up procedure, that can be synchronized with the server-side resources to generate the per-session instances of the frame of reference in a manner that is synchronized.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for identification and verification of a user at a client platform in a client/server, computer-networking system that implements an authentication server, the method using an authentication credential as a shared secret with the authentication server, the authentication credential comprising a data set (i) identifying a first enumerated pattern of fields on a frame of reference, and (ii) identifying a second enumerated pattern of fields on the frame of reference; the fields in the first and second enumerated patterns having locations on the frame of reference, and numbered positions in the corresponding enumerated patterns; the method comprising:

using a data processing machine or data processing machines, establishing one or more communication channels to the authentication server, and sending a user identifier via said one or more communication channels to the authentication server;

receiving a session specific instance of the frame of reference as a result of successful identification of the user identifier by the authentication server, from the authentication server, from an application synchronized with a logical function used to produce an instance at the authentication server or from a combination of the authentication server and an application, the session-specific instance of the frame of reference having fields filled with a session-specific content, wherein the session-specific content comprises characters that are members of a set of characters;

rendering an interface on a display including a graphical representation of the session-specific instance of the frame of reference where:

a subset of the fields in the first enumerated pattern are populated by characters in said session specific instance identifying a first session specific set of numbered positions of fields along the second enumerated pattern, and characters in the fields having the first session specific set of numbered positions in the second enumerated pattern match characters in fields at locations on said session specific instance having a second session specific set of numbered positions in the first enumerated pattern;

sending authentication response data via said one or more communication channels to the authentication server, the response data identifying said second session specific set of numbered positions in the first enumerated pattern, data identifying said second session specific set of numbered positions in the first enumerated pattern being usable by the authentication server as part of a verification process; and receiving a signal via said one or more communication channels from the authentication server that indicates completion of the verification process.

2. The method of claim 1, including rendering the interface using a first data processing machine, and sending authentication response data using a second data processing machine.

3. The method of claim 1, wherein the set of characters consists of a number N1 of characters, and the session-specific instance of the frame of reference includes a number N2 of locations populated by characters from the set of characters, where N2 is equal to or greater than a multiple M times N1, and the multiple M is at least 2.

4. The method of claim 1, wherein the set of characters consists of a number of characters, and each character in the set of characters is included in at least two fields having locations on the session-specific instance of the frame of reference.

5. The method of claim 1, wherein for a given session-specific instance of the frame of reference, if there are no locations in the first enumerated pattern that include a character matching one of the challenge characters, then applying a rule to determine a character to include in the response data.

6. The method of claim 1, wherein said second session specific set of numbered positions in the first enumerated pattern is identified in the response data by characters in the character set.

7. An interactive method for authentication of a client using a computer, comprising:

storing data defining a graphical representation of a frame of reference adapted for rendering on a display, the frame of reference including a number N of pre-defined fields having locations on the frame of reference;

storing a data set associated with the client in a memory, the data set including a first and second shared secrets, the first shared secret comprising data identifying a first enumerated pattern of fields oil a frame of reference, and the second shared secret comprising data identifying a second enumerated pattern of fields on the frame of reference, the fields in the first and second enumerated patterns having locations on the frame of reference and numbered positions in the corresponding enumerated patterns;

producing an instance of the frame of reference, in which locations in the frame of reference are populated by members of a set of characters, where:

a subset of the fields in the first enumerated pattern are populated by characters in said instance identifying a first session specific set of numbered positions of fields along the second enumerated pattern, and characters in the fields having the first session specific set of numbered positions in the second enumerated pattern match characters in fields at locations on said instance having a second session specific set of numbered positions in the first enumerated pattern;

accepting input data from the client in response to said instance, the input data identifying one or more numbered positions in the first enumerated pattern; and determining whether the input data identifies said second session specific set of numbered positions in the first enumerated pattern; and if the input data identifies said second session specific set of numbered positions, signaling successful authentication.

8. The method of claim 7, including sending to the client said instance of the frame of reference by sending an electronic document executable by the client to render said instance.

9. The method of claim 7, wherein the set of characters consists of a number N1 of characters, and the instance of the frame of reference includes a number N2 of locations populated by characters from the set of characters, where N2 is equal to or greater than a multiple M times N1, and the multiple M is at least 2.

10. The method of claim 7, wherein said producing an instance of the frame of reference includes executing logical function at the authentication server that is synchronized with an application used to produce an instance at the client.

11. A client-server authentication system to authenticate a client, comprising:

data processing resources, including one or more processors, memory and a communication interface;

data stored in said memory including authentication credentials, where an authentication credential for a particular client comprises a data set associated with the client in a memory, the data set including a first and second shared secrets, the first shared secret comprising data identifying a first enumerated pattern of fields on a frame of reference, and the second shared secret comprising data identifying a second enumerated pattern of fields on the frame of reference, the fields in the first and second enumerated patterns having locations on the frame of reference and numbered positions in the corresponding enumerated patterns;

the data processing resources including executable instructions stored in said memory adapted for execution by the processor, including logic:

to produce an instance of the frame of reference in which the locations are populated by members of a set of characters; where:

a subset of the fields in the first enumerated pattern are populated by characters in said instance identifying a first session specific set of numbered positions of fields along the second enumerated pattern, and characters in the fields having the first session specific set of numbered positions in the second enumerated pattern match characters in fields at locations on said instance having a second session specific set of numbered positions in the first enumerated pattern;

to accept input data from the client in response to said instance, the input data identifying one or more numbered positions in the first enumerated pattern; and to determine whether the input data identifies said second session specific set of numbered positions in the first enumerated pattern; and if the input data identifies said second session specific set of numbered positions, signaling successful authentication.

12. The system of claim 11, including logic to send to the client said instance of the frame of reference by sending to the client an electronic document executable by the client to render said instance.

13. The system of claim 11, wherein the set of characters consists of a number N1 of characters, and the instance of the frame of reference includes a number N2 of locations populated by characters from the set of characters, where N2 is equal to or greater than a multiple M times N1, and the multiple M is at least 5.

14. The system of claim 11, including logic to send to the client said instance of the frame of reference using a first communication medium.

15. The system of claim 11, wherein said logic to produce an instance of the frame of reference includes a logical function characterized in that it can be synchronized with an application used to produce an instance at the client.

16. A non-transitory computer readable medium storing a computer program that causes a computer to authenticate a client, comprising instructions to:

store data in a memory including authentication credentials, where an authentication credential for a particular client comprises a data set associated with the client in a memory, the data set including a first and second shared secrets, the first shared secret comprising data identifying a first enumerated pattern of fields on a frame of reference, and the second shared secret comprising data identifying a second enumerated pattern of fields on the frame of reference, the fields in the first and second enumerated patterns having locations on the frame of reference and numbered positions in the corresponding enumerated patterns;

to produce an instance of the frame of reference in which the locations are populated by members of a set of characters; where:

a subset of the fields in the first enumerated pattern are populated by characters in said instance identifying a first session specific set of numbered positions of fields along the second enumerated pattern, and characters in the fields of said instance having the first session specific set of numbered positions in the second enumerated pattern match characters in fields at locations on said instance having a second session specific set of numbered positions in the first enumerated pattern;

to accept input data from the client in response to said instance, the input data identifying one or more numbered positions in the first enumerated pattern; and to determine whether the input data identifies said second session specific set of numbered positions in the first enumerated pattern; and if the input data identifies said second session specific set of numbered positions, to signal successful authentication.

17. The non-transitory computer readable medium of claim 16, said instructions including logic to send to the client said instance of the frame of reference by sending to the client an electronic document executable by the client to render said instance.

18. The non-transitory computer readable medium of claim 16, wherein the set of characters consists of a number N1 of characters, and the instance of the frame of reference includes a number N2 of locations populated by characters from the set of characters, where N2 is equal to or greater than a multiple M times N1, and the multiple M is at least 5.

19. The non-transitory computer readable medium of claim 16, said instructions including logic to send to the client said instance of the frame of reference using a first communication medium.

20. The non-transitory computer readable medium of claim 16, wherein said logic to produce an instance of the frame of reference includes a logical function characterized in that it can be synchronized with an application used to produce an instance at the client.

21. A method for identification and verification of a user at a client platform in a client/server, computer-networking system that implements an authentication server, the method using an authentication credential as a shared secret with the authentication server, the authentication credential comprising a data set (i) identifying a first enumerated pattern of fields on a first frame of reference, and (ii) identifying a second enumerated pattern of fields on a second frame of reference, the fields in the first and second enumerated patterns having locations on the corresponding one of the first and second frames of reference, and numbered positions in the corresponding enumerated patterns; the method comprising:

using a data processing machine or data processing machines, establishing one or more communication channels to the authentication server, and sending a user identifier via said one or more communication channels to the authentication server;

receiving a first session specific instance of the first frame of reference and a second session specific instance of the second frame of reference, in which fields locations in said first and second frames of reference are populated by members of a set of characters as a result of successful identification of the user identifier by the authentication server, from the authentication server, from an application synchronized with a logical function used to produce an instance at the authentication server or from a combination of the authentication server and an application, the first and second session-specific instances having fields filled with a session-specific content, wherein the session-specific content comprises characters that are members of a set of characters;

rendering an interface or interfaces on one or more displays including graphical representations of the first and second session-specific instances where:

a subset of the fields in said first session specific instance in the first enumerated pattern are populated by characters identifying a first session specific set of numbered positions of fields along the second enumerated pattern, and characters in the fields in said second session specific instance having the first session specific set of numbered positions in the second enumerated pattern match characters in fields at locations on said first session specific instance having a second session specific set of numbered positions in the first enumerated pattern;

sending authentication response data via said one or more communication channels to the authentication server, the response data identifying said second session specific set of numbered positions in the first enumerated pattern, data identifying said second session specific set of numbered positions in the first enumerated pattern being usable by the authentication server as part of a verification process; and receiving a signal via said one or more communication channels from the authentication server that indicates completion of the verification process.

22. The method of claim 21, including rendering a first interface including the first session specific instance, using a first data processing machine, rendering a second interface including the second session specific instance using a second data processing machine, and sending authentication response data using one of the first and second data processing machines.

23. The method of claim 21, wherein the set of characters consists of a number N1 of characters, and the first and second session-specific instances include a number N2 of locations populated by characters from the set of characters, where N2 is equal to or greater than a multiple M times N1, and the multiple M is at least 2.

24. The method of claim 21, wherein the set of characters consists of a number of characters, and each character in the set of characters is included in at least two fields on the first and second session-specific instances.

25. The method of claim 21, wherein for a given one of the first session-specific instance of the frame of reference, if there are no fields in the first enumerated pattern that include a character matching a character in the one of the fields in said second session specific instance having the first session specific set of numbered positions, then applying a rule to determine a character to include in the response data.

26. The method of claim 21, wherein said second session specific set of numbered positions in the first enumerated pattern is identified in the response data by characters in the character set.

27. An interactive method for authentication of a client using a computer, comprising:
   storing data defining a graphical representation of a frame of reference adapted for rendering on a display, the frame of reference including a number N of pre-defined fields having locations on the frame of reference;
   storing a data set associated with the client in a memory, the data set (i) identifying a first enumerated pattern of fields on a first frame of reference, and (ii) identifying a second enumerated pattern of fields on a second frame of reference, the fields in the first and second enumerated patterns having locations on the corresponding one of the first and second frames of reference, and numbered positions in the corresponding enumerated patterns;
   producing a first session specific instance of the first frame of reference and a second session specific instance of the second frame of reference, in which fields locations in said first and second frames of reference are populated by members of a set of characters, where:
      a subset of the fields in said first session specific instance in the first enumerated pattern are populated by characters identifying a first session specific set of numbered positions of fields along the second enumerated pattern, and
      characters in the fields in said second session specific instance having the first session specific set of numbered positions in the second enumerated pattern match characters in fields at locations on said first session specific instance having a second session specific set of numbered positions in the first enumerated pattern;
   accepting input data from the client in response to said instance, the input data identifying one or more numbered positions in the first enumerated pattern; and
   determining whether the input data identifies said second session specific set of numbered positions in the first enumerated pattern; and if the input data identifies said second session specific set of numbered positions, signaling successful authentication.

28. The method of claim 27, including sending to the client said first session-specific instance by sending an electronic document executable by the client to render said instance.

29. The method of claim 27, wherein the set of characters consists of a number N1 of characters, and the first session-specific instance and the second session specific instance include a number N2 of locations populated by characters from the set of characters, where N2 is equal to or greater than a multiple M times N1, and the multiple M is at least 2.

30. The method of claim 27, wherein said producing a first session-specific instance includes executing logical function at the authentication server that is synchronized with an application used to produce an instance at the client.

31. A client-server authentication system to authenticate a client, comprising:
   data processing resources, including one or more processors, memory and a communication interface;
   data stored in said memory including authentication credentials, where an authentication credential for a particular client comprises a data set associated with the client in a memory, the data set (i) identifying a first enumerated pattern of fields on a first frame of reference, and (ii) identifying a second enumerated pattern of fields on a second frame of reference, the fields in the first and second enumerated patterns having locations on the corresponding one of the first and second frames of reference, and numbered positions in the corresponding enumerated patterns;
   the data processing resources including executable instructions stored in said memory adapted for execution by the processor, including logic:
   to produce a first session specific instance of the first frame of reference and a second session specific instance of the second frame of reference, in which fields locations in said first and second frames of reference are populated by members of a set of characters, where:
      a subset of the fields in said first session specific instance in the first enumerated pattern are populated by characters identifying a first session specific set of numbered positions of fields along the second enumerated pattern, and
      characters in the fields in said second session specific instance having the first session specific set of numbered positions in the second enumerated pattern match characters in fields at locations on said first session specific instance having a second session specific set of numbered positions in the first enumerated pattern;
   to accept input data from the client in response to said instance, the input data identifying one or more numbered positions in the first enumerated pattern; and to determine whether the input data identifies said second session specific set of numbered positions in the first enumerated pattern; and if the input data identifies said second session specific set of numbered positions, signaling successful authentication.

32. The system of claim 31, including logic to send to the client said instance of the frame of reference by sending to the client an electronic document executable by the client to render said instance.

33. The system of claim 31, wherein the set of characters consists of a number N1 of characters, and the instance of the frame of reference includes a number N2 of locations populated by characters from the set of characters, where N2 is equal to or greater than a multiple M times N1, and the multiple M is at least 5.

34. The system of claim 31, including logic to send to the client said instance of the frame of reference using a first communication medium.

35. The system of claim 31, wherein said logic to produce an instance of the frame of reference includes a logical function characterized in that it can be synchronized with an application used to produce an instance at the client.

36. A non-transitory computer readable medium storing a computer program that causes a computer to authenticate a client, comprising instructions to:
- store data in a memory including authentication credentials, where an authentication credential for a particular client comprises a data set associated with the client in a memory, the data set (i) identifying a first enumerated pattern of fields on a first frame of reference, and (ii) identifying a second enumerated pattern of fields on a second frame of reference, the fields in the first and second enumerated patterns having locations on the corresponding one of the first and second frames of reference, and numbered positions in the corresponding enumerated patterns;
- to produce a first session specific instance of the first frame of reference and a second session specific instance of the second frame of reference, in which fields locations in said first and second frames of reference are populated by members of a set of characters, where:
  - a subset of the fields in said first session specific instance in the first enumerated pattern are populated by characters identifying a first session specific set of numbered positions of fields along the second enumerated pattern, and
  - characters in the fields in said second session specific instance having the first session specific set of numbered positions in the second enumerated pattern match characters in fields at locations on said first session specific instance having a second session specific set of numbered positions in the first enumerated pattern;
- to accept input data from the client in response to said instance, the input data identifying one or more numbered positions in the first enumerated pattern; and
- to determine whether the input data identifies said second Session specific set of numbered positions in the first enumerated pattern; and if the input data identifies said second session specific set of numbered positions, to signal successful authentication.

37. The non-transitory computer readable medium of claim 36, said instructions including logic to send to the client said instance of the frame of reference by sending to the client an electronic document executable by the client to render said instance.

38. The non-transitory computer readable medium of claim 36, wherein the set of characters consists of a number N1 of characters, and the instance of the frame of reference includes a number N2 of locations populated by characters from the set of characters, where N2 is equal to or greater than a multiple M times N1, and the multiple M is at least 5.

39. The non-transitory computer readable medium of claim 36, said instructions including logic to send to the client said instance of the frame of reference using a first communication medium.

40. The non-transitory computer readable medium of claim 36, wherein said logic to produce an instance of the frame of reference includes ea logical function that can be synchronized with an application used to produce an instance at the client.

* * * * *

UNITED STATES PATENT AND TRADEMARK OFFICE
CERTIFICATE OF CORRECTION

PATENT NO. : 8,955,074 B2
APPLICATION NO. : 13/658812
DATED : February 10, 2015
INVENTOR(S) : Edward M. Barton and Len L. Mizrah It is certified that error appears in the above-identified patent and that said Letters Patent is hereby corrected as shown below:

In the Claims
In claim 7, in column 23, line 49, after "fields" delete "oil" and insert -- on --.

In claim 27, column 27, line 45, after "instance" delete "haying" and insert -- having --.

In claim 36, column 30, line 5, delete "Session" and insert -- session --.

In claim 40, column 30, line 27, after "includes" delete "ea logical function" and insert -- a logical function characterized in that it --.

Signed and Sealed this
Twenty-second Day of September, 2015

Michelle K. Lee
*Director of the United States Patent and Trademark Office*